(12) United States Patent
Keller

(10) Patent No.: US 12,405,173 B2
(45) Date of Patent: Sep. 2, 2025

(54) DIGITAL COOKING THERMOMETERS HAVING DYNAMO ASSEMBLIES INCORPORATED THEREIN FOR GENERATING ELECTRICAL POWER UTILIZED FOR OPERATING THE THERMOMETERS

(71) Applicant: Maverick Industries, Inc., Edison, NJ (US)

(72) Inventor: Darren Keller, Easton, PA (US)

(73) Assignee: Maverick Industries, Inc., Edison, NJ (US)

( * ) Notice: Subject to any disclaimer, the term of this patent is extended or adjusted under 35 U.S.C. 154(b) by 621 days.

(21) Appl. No.: 17/882,218

(22) Filed: Aug. 5, 2022

(65) Prior Publication Data

US 2024/0044719 A1 Feb. 8, 2024

(51) Int. Cl.
| | | |
|---|---|---|
| *G01K 7/22* | (2006.01) | |
| *G01K 1/02* | (2021.01) | |
| *G01K 1/14* | (2021.01) | |
| *H02K 7/116* | (2006.01) | |
| *H02K 7/18* | (2006.01) | |

(52) U.S. Cl.
CPC .............. *G01K 7/22* (2013.01); *G01K 1/028* (2013.01); *G01K 1/146* (2013.01); *H02K 7/116* (2013.01); *H02K 7/1853* (2013.01); *G01K 2207/06* (2013.01)

(58) Field of Classification Search
CPC .......... G01K 7/22; G01K 1/028; G01K 1/146; H02K 7/116; H02K 7/1853
See application file for complete search history.

(56) References Cited

U.S. PATENT DOCUMENTS

| | | | | | |
|---|---|---|---|---|---|
| 2,882,503 | A | * | 4/1959 | Huff ....................... | G01L 9/0026 336/135 |
| 4,354,448 | A | * | 10/1982 | Lin .......................... | G10K 9/16 116/148 |
| 5,435,235 | A | * | 7/1995 | Yoshida .................. | A21B 7/005 99/344 |
| 5,617,597 | A | * | 4/1997 | Reitz ...................... | B26B 11/008 7/113 |

(Continued)

*Primary Examiner* — Laura Martin
*Assistant Examiner* — Philip L Cotey
(74) *Attorney, Agent, or Firm* — Charney IP Law LLC

(57) ABSTRACT

A digital cooking thermometer includes a housing having a proximal end, a distal end, a printed circuit board disposed within the housing, and an electronic visual display in communication with the printed circuit board. The digital cooking thermometer has a dynamo assembly housing coupled with the distal end of the housing that is configured to rotate relative to the housing, and a dynamo assembly disposed within the dynamo assembly housing. The dynamo assembly is in communication with the printed circuit board and is configured to generate electrical current upon rotation of the dynamo assembly housing. A temperature probe is coupled with the dynamo assembly housing. The temperature probe includes a sensor for obtaining temperature readings. The temperature probe is moveable from a retracted position to an extended position for simultaneously rotating the dynamo assembly housing for generating the electrical current used for operating the digital cooking thermometer.

20 Claims, 19 Drawing Sheets

(56) References Cited

U.S. PATENT DOCUMENTS

| | | | | |
|---|---|---|---|---|
| 5,634,719 A * | 6/1997 | La Neve | | G01K 1/146 |
| | | | | 374/208 |
| 5,899,569 A * | 5/1999 | Favale | | G01K 13/00 |
| | | | | D8/57 |
| 5,983,783 A * | 11/1999 | Archard | | A47J 43/283 |
| | | | | 99/421 A |
| 6,000,845 A * | 12/1999 | Tymkewicz | | G01K 1/146 |
| | | | | 374/163 |
| 6,536,370 B2 * | 3/2003 | Paton | | G01N 31/229 |
| | | | | 374/102 |
| 6,539,842 B1 * | 4/2003 | Chapman | | A47J 37/049 |
| | | | | 374/E1.004 |
| 6,736,086 B2 * | 5/2004 | Kaiser | | G01K 5/70 |
| | | | | 374/E5.041 |
| 7,306,366 B1 * | 12/2007 | Camenzind | | G01G 23/3728 |
| | | | | 374/170 |
| 7,520,668 B2 * | 4/2009 | Chen | | G01K 1/14 |
| | | | | 374/170 |
| 7,613,210 B2 * | 11/2009 | Takehara | | G16H 40/20 |
| | | | | 714/39 |
| 8,235,591 B2 * | 8/2012 | Harris | | G01J 5/0037 |
| | | | | 374/150 |
| 8,240,914 B1 * | 8/2012 | Chapman | | G01K 1/024 |
| | | | | 374/208 |
| 9,971,286 B2 * | 5/2018 | Kikegawa | | G03G 15/2039 |
| 10,620,055 B2 * | 4/2020 | Keller | | G01K 13/00 |
| 2001/0040911 A1 * | 11/2001 | Rubenstein | | G01K 1/14 |
| | | | | 340/584 |
| 2002/0073853 A1 * | 6/2002 | Norcross | | A23L 5/28 |
| | | | | 374/E1.018 |
| 2002/0150144 A1 * | 10/2002 | Chapman | | A47J 37/1266 |
| | | | | 374/189 |
| 2003/0042741 A1 * | 3/2003 | Hartman | | H02K 21/14 |
| | | | | 290/1 C |
| 2003/0112845 A1 * | 6/2003 | Kaiser | | G01K 5/70 |
| | | | | 374/E5.041 |
| 2004/0046462 A1 * | 3/2004 | Chen | | H02K 7/06 |
| | | | | 310/20 |
| 2006/0118534 A1 * | 6/2006 | Casner | | B23K 9/1062 |
| | | | | 219/130.21 |
| 2006/0203878 A1 * | 9/2006 | Pearl | | G01K 1/024 |
| | | | | 374/E1.004 |
| 2009/0012656 A1 * | 1/2009 | Uchiyama | | B29C 45/762 |
| | | | | 700/306 |
| 2009/0324785 A1 * | 12/2009 | Ceravalls Pujol | | G01K 1/026 |
| | | | | 99/325 |
| 2010/0013543 A1 * | 1/2010 | Kang | | G01K 7/00 |
| | | | | 327/512 |
| 2011/0127342 A1 * | 6/2011 | Bauchot | | A47J 27/0802 |
| | | | | 236/46 A |
| 2011/0168642 A1 * | 7/2011 | Maiden | | C02F 1/325 |
| | | | | 210/138 |
| 2013/0196038 A1 * | 8/2013 | Liu | | A47J 37/1266 |
| | | | | 426/233 |
| 2019/0049313 A1 * | 2/2019 | Keller | | G01K 7/02 |
| 2019/0146476 A1 * | 5/2019 | Cella | | G05B 19/41875 |
| | | | | 702/188 |
| 2022/0344560 A1 * | 10/2022 | Zhao | | G01K 1/08 |
| 2023/0010000 A1 * | 1/2023 | Tangeman | | H04B 1/3883 |

\* cited by examiner

DIGITAL COOKING THERMOMETERS HAVING DYNAMO ASSEMBLIES INCORPORATED THEREIN FOR GENERATING ELECTRICAL POWER UTILIZED FOR OPERATING THE THERMOMETERS

BACKGROUND OF THE INVENTION

Field of the Invention

The present patent application is generally related to cooking and is more particularly related to electronic temperature probes used for monitoring cooking operations.

Description of the Related Art

The accurate and reliable measurement of temperatures is particularly important in the food preparation industry. Cooking to exact temperature ranges is also critical in gourmet cooking and to avoid undercooking food items. As a result, a number of devices have been developed to accurately measure the temperature of food items being cooked.

For example, U.S. Pat. No. 5,983,783 to Archer discloses an electronic chefs fork which displays indicia such as food type and degree of doneness for a selected food type and temperature, and which includes control areas by which a user selects a meat type. The electronic chefs fork includes operational circuitry that enables a user to select among an array of food type options and to designate a degree of doneness for the selected food types. A prompt message is provided to indicate the degree of doneness attained for the selected food type when the device is inserted into food.

U.S. Pat. No. 8,240,914 to Chapman et al., assigned to Maverick Industries, Inc. discloses a wireless remote cooking thermometer system includes a first unit positionable at a first location adjacent food being cooked, the first unit including a radio frequency transmitter adapted to transmit a temperature signal associated with temperature readings of the food being cooked. The system also includes at least one microprocessor operative to calibrate taste and choice preferences. The system also includes a temperature probe and a second unit that includes a noise generator or visual indicator and a radio frequency receiver for reception of the signal from the transmitter.

U.S. Pat. No. 6,539,842 to Chapman et al., assigned to Maverick Industries, Inc., discloses a rotisserie system includes a rotatable skewer adapted to secure meat, the rotatable skewer including a temperature sensor for recording a temperature of the meat and a wireless transmitter for wirelessly transmitting the temperature. The system also includes a remote temperature monitor having a wireless receiver for receiving the wirelessly transmitted temperature and a visual display for displaying the temperature, whereby the remote temperature monitor is movable away from the rotatable skewer while remaining in wireless communication with the wireless transmitter to enable an operator to continuously monitor the cooking temperature of the meat. The wireless transmission and reception may be accomplished using infrared light or radio frequency waves.

Many temperature monitoring devices have been incorporated into devices having extendable temperature probes or devices that perform multiple functions.

For example, U.S. Pat. No. 6,000,845 to Tyrnkewicz et al. discloses a temperature sensing and indicating device including a housing and an arm that is retractable and extendable into and out of the housing so that the length of the arm can be varied in a predetermined manner. A probe having a temperature sensor therein is enclosed by the arm so that varying the external length of the arm exposes varying lengths of the probe, whereby the exposed length of the probe is inserted into a medium so that the temperature sensor senses the temperature of the medium and converts the temperature sensed into a signal. Using a microprocessor, the signal is conditioned and converted for controlling a visual display that provides a visual indication of the temperature sensed. The visual indication includes a digital numeric display and an analog display.

U.S. Pat. No. 5,634,719 to La Neve discloses a food-handling device which a retractable boom mounted temperatures probe. The tool has a probe mounted on a manually retractable boom, the probe being extendable over various sites of the food being checked. The boom is pivotally attached to the elongated arm of a spatula and, by a scissor-like action, is raised out of and lowered into the food. The tool is provided with a temperature indicator in the form of a digital readout.

U.S. Pat. No. 7,306,366 to Camenzind et al. discloses a pocketknife having multifunctional tools such as an altitude indicator, a compass, a barometer, a thermometer, a hygrometer, an anemometer, a speed indicator, a balance and/or a satellite navigation device.

U.S. Pat. No. 7,520,668 to Chen discloses a multi-function thermometer that operates to display temperatures sensed by one or more temperature sensors. The thermometer has a thermometer housing and a temperature probe engaged to the housing, the probe being translatable between a first stowed position and a second deployed position. An infrared temperature reader element is also engaged to the housing, and operative to sense the temperature of objects remote from the housing, within a field of view of the infrared reader element. A temperature display is connected to the retractable probe and to the infrared temperature reader element. The display is operative to display temperatures sensed by the retractable probe and/or the infrared reader element.

U.S. Pat. No. 10,620,055 to Keller, assigned to Maverick Industries, Inc. of Edison, New Jersey, discloses a multi-function cooking tool includes a housing, an electronic visual display provided on the housing, and a temperature probe coupled with the housing. The temperature probe is moveable between a first position in which the temperature probe is stored inside the housing and a second position in which the temperature probe extends from the housing. A control system is disposed in the housing and is in communication with the temperature probe and the visual display. When the temperature probe is in the second position the control system is programmed to display information on the visual display that corresponds to temperature readings sensed by the temperature probe. When the temperature probe is returned from the second position to the first position the control system commences a count-up timer program that displays on the visual display the amount of time that has elapsed since the temperature probe was moved from the second position to the first position.

In spite of the above advances, there remains a need for improved cooking thermometers and temperature monitoring systems that have integrated power sources such as dynamos that may be activated for generating the electrical current that is required for operating and/or providing power for the cooking thermometer.

SUMMARY OF THE INVENTION

In one embodiment, a digital cooking thermometer preferably includes a housing having a proximal end and a distal end, a printed circuit board disposed within the housing, and an electronic visual display in communication with the printed circuit board.

In one embodiment, the digital cooking thermometer preferably includes a dynamo assembly housing that is coupled with the distal end of the housing and that is configured to rotate relative to the housing.

In one embodiment, a dynamo assembly is disposed within the dynamo assembly housing. The dynamo assembly is preferably in communication with the printed circuit board and is configured to generate electrical current upon rotation of the dynamo assembly housing.

As used herein, the term dynamo is defined as a machine or device for converting mechanical energy into electrical energy. A dynamo may also be defined as a generator. A dynamo may generate an electrical current, such as direct current.

In one embodiment, a temperature probe is coupled with the dynamo assembly housing. In one embodiment, the temperature probe includes a sensor for obtaining temperature readings that are transmitted to the printed circuit board.

In one embodiment, the temperature probe is moveable from a retracted position in which the temperature probe extends along a side of the housing to an extended position in which the temperature probe extends distally beyond the distal end of the housing. As the temperature probe moves from the retracted position to the extended position, the temperate probe simultaneously rotates the dynamo assembly housing, which, in turn, activates the dynamo assembly for generating the electrical current.

In one embodiment, the housing may be made of plastic, metal and/or a combination of plastic and metal.

In one embodiment, the temperature probe may be made of metal such as stainless steel.

In one embodiment, the electronic visual display is disposed on the housing and is configured for displaying temperature readings obtained by the temperature probe.

In one embodiment, the digital cooking thermometer desirably includes a conductive pathway extending between the sensor and the printed circuit board for transmitting temperature readings from the sensor to the printed circuit board.

In one embodiment, the dynamo assembly preferably includes a series of rotatable gears that are disposed within the dynamo assembly housing.

In one embodiment, the dynamo assembly housing desirably includes a ring gear that surrounds the series of rotatable gears. In one embodiment, the ring gear preferably has gear teeth that mesh with a gear of the series of rotatable gears.

In one embodiment, the dynamo assembly may include a coil housing and a rotatable magnet disposed within the coil housing that is configured to rotate relative to the coil housing for generating the electrical current.

In one embodiment, the dynamo assembly may include a rotatable shaft having an upper end coupled with a second gear of the series of rotatable gears and a lower end coupled with the rotatable magnet.

In one embodiment, the digital cooking thermometer may have a depressible temperature hold button that is accessible at an outer surface of the housing. The depressible temperature hold button is in communication with the printed circuit board and may be depressed for holding and/or displaying for an extended period of time the last temperature reading obtained by using the temperature probe.

In one embodiment, the digital cooking thermometer preferably includes a temperature unit display button accessible at an outer surface of the housing that is depressible a first time for displaying temperature readings on the electronic visual display in Celsius and a second time for displaying the temperature readings on the electronic visual display in Fahrenheit.

In one embodiment, a digital cooking thermometer preferably includes a housing having a proximal end and a distal end, a printed circuit board disposed within the housing, and an electronic visual display in communication with the printed circuit board.

In one embodiment, the digital cooking thermometer desirably includes a dynamo assembly in communication with the printed circuit board, which is configured to generate electrical current that is supplied to the printed circuit board for operating the digital cooking thermometer.

In one embodiment, the digital cooking thermometer desirably includes a temperature probe coupled with the dynamo assembly. The temperature probe is moveable from a retracted position in which the temperature probe extends along a side of the housing to an extended position in which the temperature probe extends distally beyond the distal end of the housing.

In one embodiment, as the temperature probe is moved from the retracted position to the extended position, the temperature rotates the dynamo assembly housing, which, in turn, simultaneously activates the dynamo assembly for generating the electrical current.

In one embodiment, the digital cooking thermometer may include a sensor located at a distal end of the temperature probe for obtaining temperature readings, and a conductive pathway extending between the sensor and the printed circuit board for transmitting temperature readings from the sensor to the printed circuit board.

In one embodiment, a dynamo assembly housing, coupled with the distal end of the housing, is configured to rotate relative to the housing.

In one embodiment, the dynamo assembly is disposed within the dynamo assembly housing. In one embodiment the temperate probe simultaneously rotates the dynamo assembly housing as the temperature probe is moved from the retracted position for storage to the extended position for obtaining temperature readings.

In one embodiment, the dynamo assembly may include a series of rotatable gears that are disposed within the dynamo assembly housing.

In one embodiment, the dynamo assembly housing preferably includes a ring gear that surrounds the series of rotatable gears. In one embodiment, the ring gear includes gear teeth that mesh with a gear of the series of rotatable gears.

In one embodiment, the dynamo assembly incudes a coil housing and a rotatable magnet disposed within the coil housing that is configured to rotate relative to the coil housing for generating the electrical current.

In one embodiment, the series of rotatable gears are coupled with the rotatable magnet.

In one embodiment, the dynamo assembly preferably has a rotatable shaft having an upper end coupled with a second gear of the series of rotatable gears and a lower end coupled with the rotatable magnet.

In one embodiment, moving the temperature probe from the retracted position to the extended position activates the dynamo assembly to generate a sufficient quantity of the electrical current to operate the digital cooking thermometer for about 30-40 seconds.

In one embodiment, a digital cooking thermometer comprising may include a housing having a proximal end and a distal end, a printed circuit board disposed inside the housing, and an electronic visual display disposed on the housing and being in communication with the printed circuit board.

In one embodiment, the digital cooking thermometer preferably includes a dynamo assembly housing that is coupled with the housing and that is configured to rotate relative to an end of the housing.

In one embodiment, a dynamo assembly is disposed within the dynamo assembly housing. In one embodiment, the dynamo assembly is activated by rotating the dynamo assembly housing for generating electrical current. The electrical current is preferably supplied to the printed circuit board for providing electrical power to operate the digital cooking thermometer.

In one embodiment, a temperature probe is desirably coupled with the dynamo assembly housing. The temperature probe preferably includes a sensor for obtaining temperature readings that are transmitted to the printed circuit board.

In one embodiment, the temperature probe is moveable from a retracted position to an extended position for simultaneously rotating the dynamo assembly housing, which, in turn, activates the dynamo assembly for generating the electrical current that is used to power the digital cooking thermometer.

In one embodiment, the dynamo assembly generates electrical current when the temperature probe is moved from the retracted position (i.e., the closed position) to the extended position (i.e., the open position).

In one embodiment, the dynamo assembly generates electrical current when the temperature probe is moved from the extended position (i.e., the open position) to the retracted position (i.e., the closed position).

In one embodiment, the dynamo assembly generates electrical current when the temperature probe moves in either direction between the retracted/closed and extended/open positions.

These and other preferred embodiments of the present patent application will be described in more detail below.

DETAILED DESCRIPTION OF PREFERRED EMBODIMENTS

Figure 1:
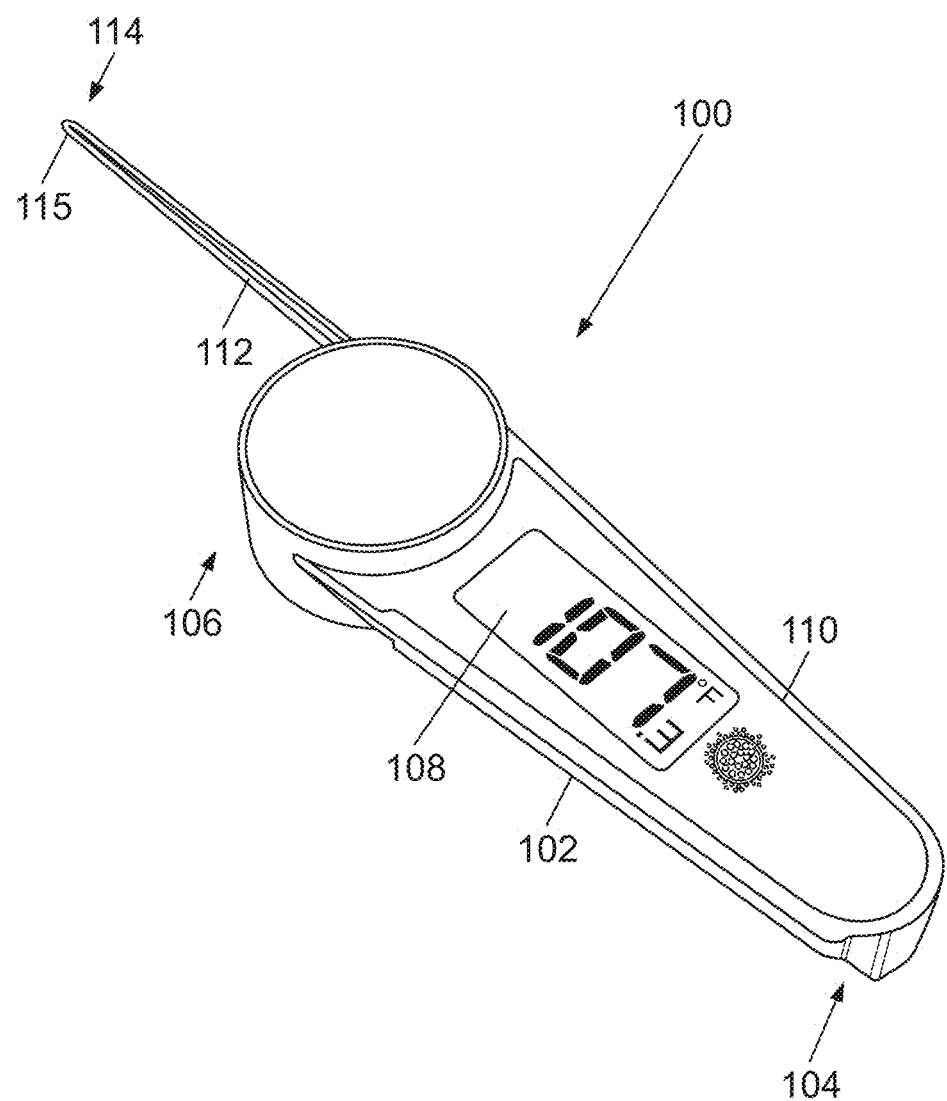
FIG. 1 is a perspective view of a digital cooking thermometer including a dynamo power source and a temperature probe, in accordance with one embodiment of the present patent application.

Referring to FIG. 1, in one embodiment, a digital cooking thermometer 100 preferably includes a housing 102 having a proximal end 104 and a distal end 106. In one embodiment, the housing 102 has an electronic visual display 108 (e.g., a temperature display screen) incorporated therein that is configured for displaying temperature readings obtained by the digital cooking thermometer 100.

In one embodiment, the digital cooking thermometer 100 may include a hold button 110 that may be engaged and/or depressed for holding the most recent temperature reading that has been obtain and displayed on the electronic visual display 108. In one embodiment, the hold button 110 may be accessible at an exposed surface of the housing 102.

In one embodiment, the digital cooking thermometer 100 preferably includes a temperature probe 112 that may be moved (e.g., swiveled, rotated) between a retracted position for storage and an extended position for obtaining temperature readings. In one embodiment, the temperature probe 112 may be swiveled and/or swung between the retracted and extended positions. In FIG. 1, the temperature probe 112 is in an extended position for being inserted into meat or fish for obtaining a temperature reading that is displayed on the electronic visual display 108 located on the housing 102.

In one embodiment, when the temperature probe 112 is in the extended position, a distal most end 114 of the temperature probe 112 preferably extends distally beyond the distal end 106 of the housing 102 of the digital cooking thermometer 100. The distal end 114 of the temperature probe 112 may include a sharpened tip 115 for facilitating insertion of the temperature probe into food (e.g., meat). In one embodiment, the distal end 114 of the temperature probe 112 may include a sensor (e.g., a thermistor) that is configured to obtain temperature readings and transmit the temperature readings to a printed circuit board and/or the electronic visual display.

In one embodiment, when the temperature probe 112 is in the retracted position, the temperature probe may be located along a lateral side of the housing 102 and/or disposed within an elongated recess that is formed in the lateral side of the housing.

In one embodiment, the housing 102 may be made of plastic, metal and/or a combination of plastic and metal components. In one embodiment, the temperature probe 112 may be made of metal such as stainless steel.

Figure 2:
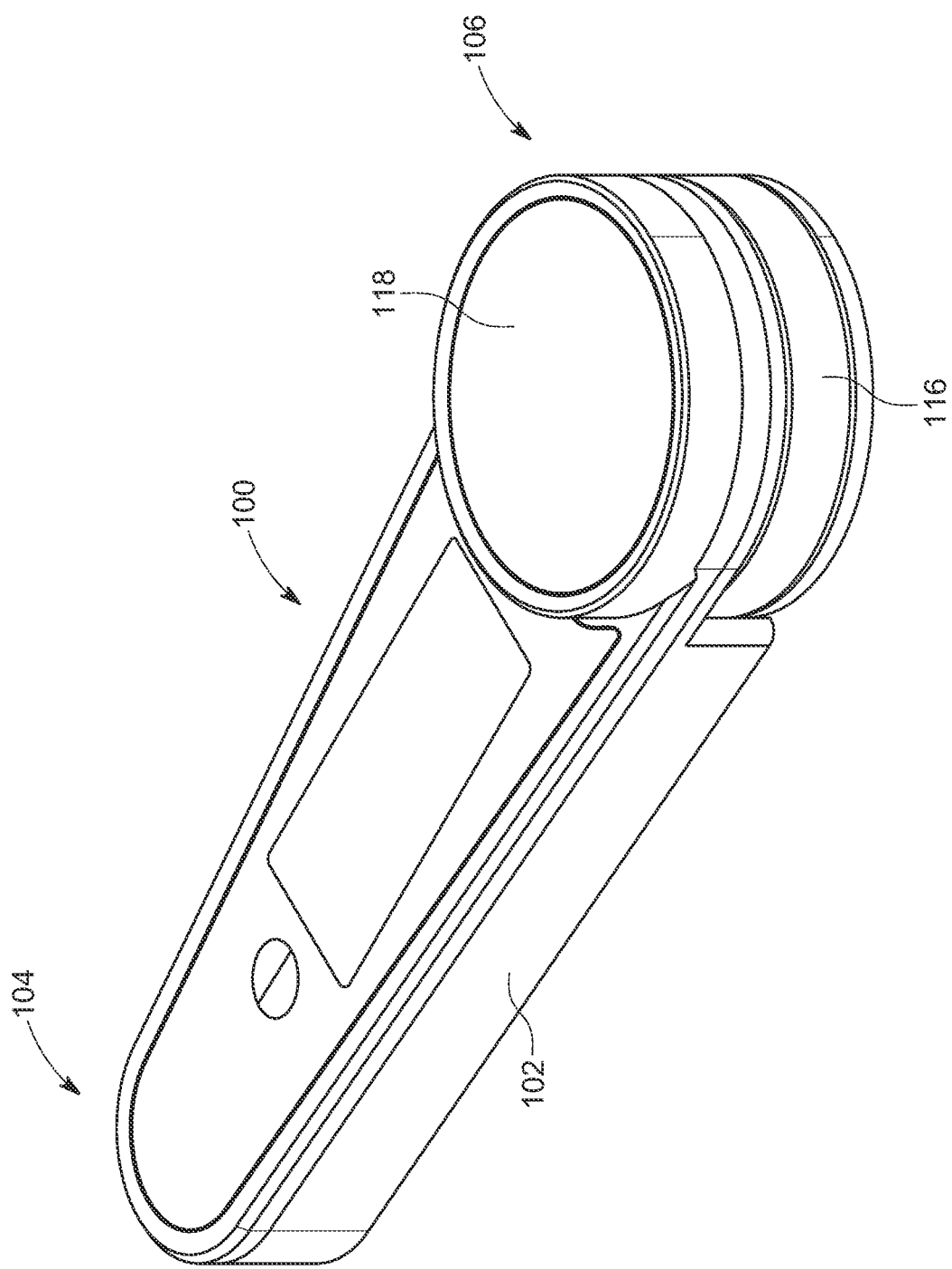
FIG. 2 is a perspective view of a distal end of the digital cooking thermometer shown in FIG. 1 with the temperature probe in a retracted position.

Referring to FIG. 2, in one embodiment, the digital cooking thermometer 100 preferably includes the housing 102 having the proximal end 104 and the distal end 106. In one embodiment, the digital cooking thermometer desirably includes a dynamo assembly housing 116 that is rotatable relative to the housing 102 for moving the temperature probe 112 (FIG. 1) between a retracted position and the extended position shown in FIG. 1. In one embodiment, as the dynamo assembly housing 116 is rotated, the temperature probe 112 (FIG. 1) is configured to move simultaneously with the dynamo assembly housing.

In one embodiment, the digital cooking thermometer 100 preferably includes a cover 118 (e.g., a stationary cover) that overlies the rotatable dynamo assembly housing 116. In one embodiment, the cover 118 may be integrally formed with the distal end 106 of the housing 102 and is configured to remain stationary as the dynamo assembly housing 116 is rotated and/or swiveled for moving the temperature probe between the retracted and extended positions.

In one embodiment, the rotatable dynamo assembly housing 116 preferably includes a dynamo assembly (not shown) that is configured to generate electrical energy (e.g., an electrical current; direct current) that may be used for providing electrical power for the digital cooking thermometer 100 for operating the electrical components of the digital cooking thermometer.

Figure 3A:
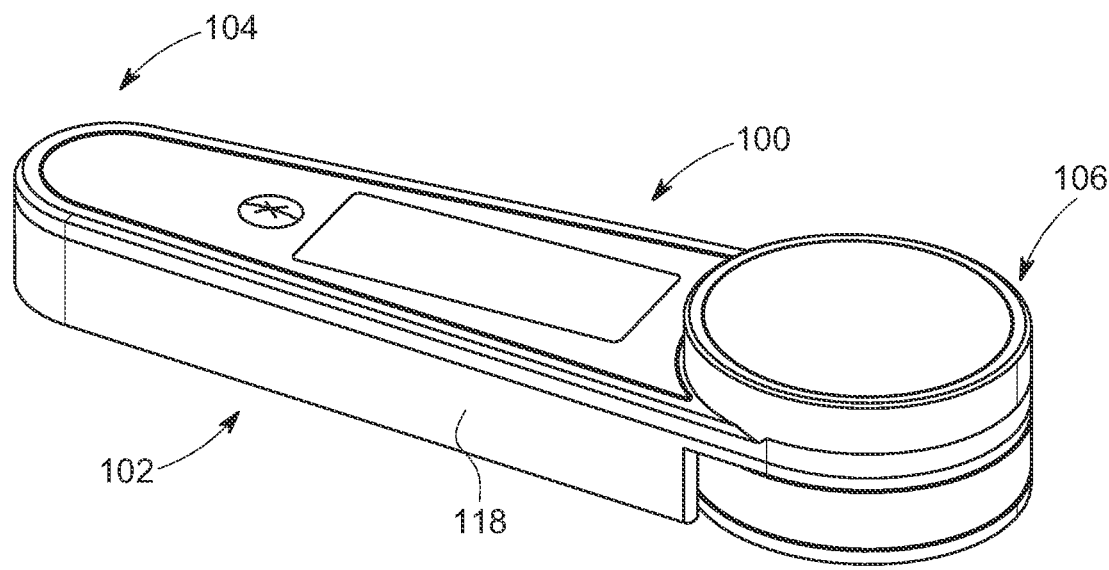
FIG. 3A is a perspective view of a right side of the digital cooking thermometer shown in FIG. 2.

Referring to FIG. 3A, in one embodiment, the digital cooking thermometer 100 preferably includes the housing 102 having the proximal end 104 and the distal end 106. In one embodiment, the housing 102 includes a first lateral side 118 (e.g., the right side) that extends between the proximal and distal ends 104, 106 of the housing 102.

Figure 3B:
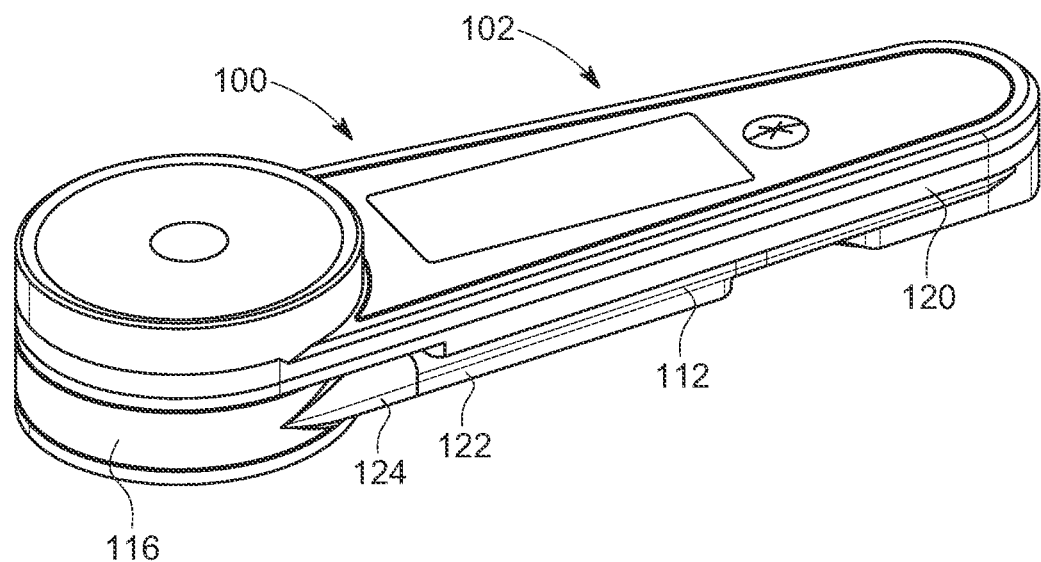
FIG. 3B is a perspective view of a left side of the digital cooking thermometer shown in FIG. 2.

Referring to FIG. 3B, in one embodiment, the housing 102 of the digital cooking thermometer 100 preferably includes a second lateral side 120 (e.g., the left side) that is configured to receive and/or seat the temperature probe 112 when the temperature probe is moved into the retracted position shown in FIG. 3B.

In one embodiment, a proximal end 122 of the temperature probe 112 is connected with the rotatable dynamo assembly housing 116 via a temperature probe connector 124 that is integrally formed with (e.g., molded with) the dynamo assembly housing 116. In one embodiment, rotation of the dynamo assembly housing 116 results in simultaneous movement of the temperature probe 112.

Figure 4:
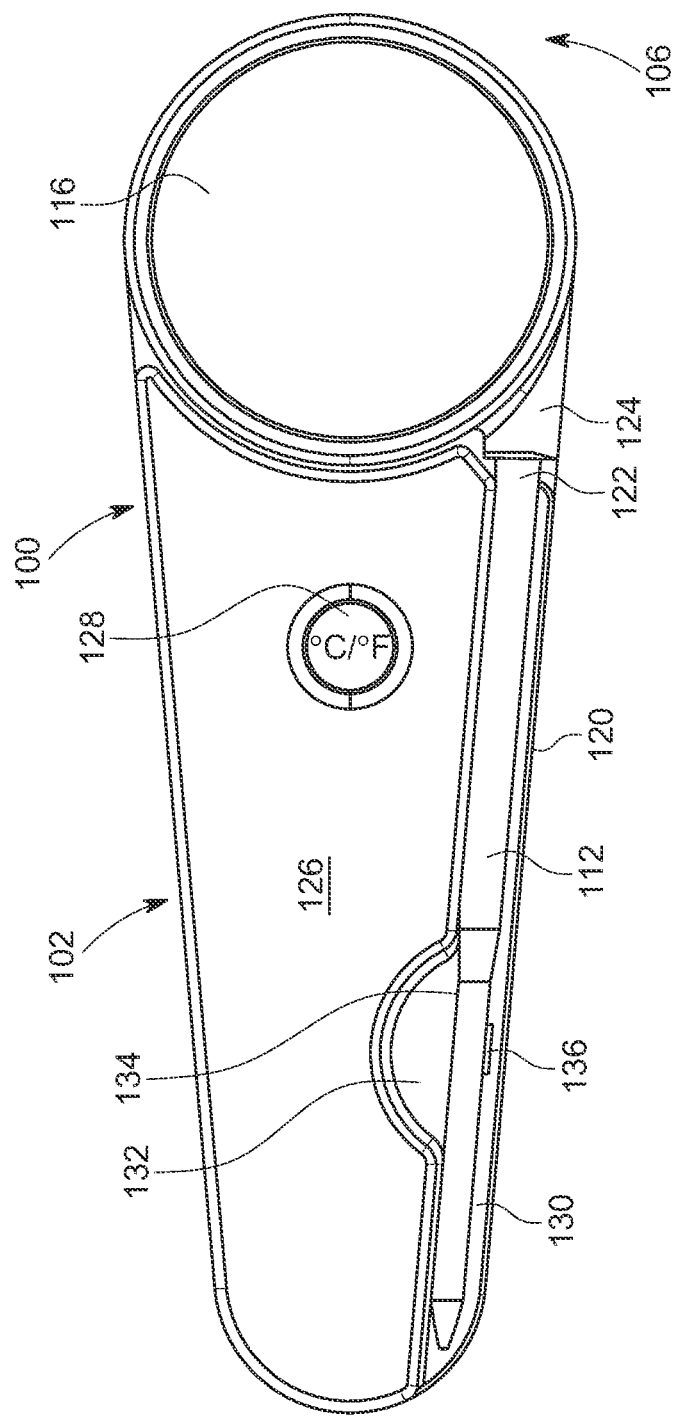
FIG. 4 is a bottom view of the digital cooking thermometer shown in FIGS. 2, 3A, and 3B.

Referring to FIG. 4, in one embodiment, the digital cooking thermometer 100 preferably includes the housing 102 having a bottom surface 126 that extends along the bottom or underside of the digital cooking thermometer 100. In one embodiment, the digital cooking thermometer 100 preferably includes a depressible temperature display button 128 that enables an operator to select whether the temperature reading displayed on the electronic visual display 108 (FIG. 1) is presented in Celsius or Fahrenheit units. In one embodiment, the temperature display button 128 is depressible for toggling back and forth between the Celsius and Fahrenheit readings each time the temperature display button 128 is depressed. Thus, an operator may choose to display temperature readings in either Celsius or Fahrenheit units.

In one embodiment, the temperature probe 112 of the digital cooking thermometer 100 may be seated within an elongated recess 130 formed in the second lateral side 120 (e.g., the left side) of the housing 102. In one embodiment, the proximal end 122 of the temperature probe 112 is connected with the temperature probe connector 124, which, in turn, is integrally formed with the rotatable dynamo assembly housing 116 located at the distal end 106 of the housing 102.

In one embodiment, the underside of the housing 102 preferably includes a finger recess 132 formed therein that enables an operator to insert one or more fingers between the housing and the temperature probe to engage an outer surface 134 of the temperature probe 112 for extracting the temperature probe from the elongated recess 130.

In one embodiment, the housing 102 preferably includes a temperature probe stop 136 that is aligned with the finger recess 132. In one embodiment, the temperature probe stop 136 may contact the temperature probe 112 for holding the temperature probe in the retracted position. In one embodiment, the temperature probe stop 136 is adapted to engage the outer surface 134 of the temperature probe 112 for retaining the temperature probe within the elongated recess 130 formed in the housing 102.

Figure 5A:
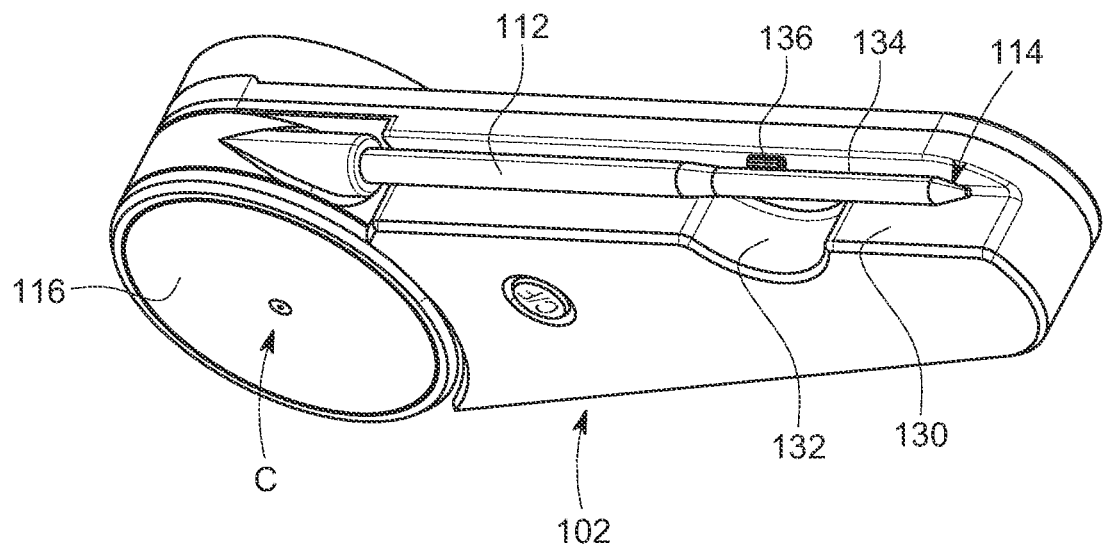
FIG. 5A is a perspective view of a left, underside of the digital cooking thermometer shown in FIG. 4.

Referring to FIG. 5A, in one embodiment, the temperature probe stop 136 may engage and/or contact an outer surface of the temperature probe 112 for holding the temperature probe in the retracted position within the elongated recess 130 of the housing 102. In one embodiment, an operator may insert one or more fingers into the finger recess 132 for engaging the outer surface 134 of the temperature probe 112 to pry/pull the distal end 114 of the temperature probe 112 away from the elongated recess 130 of the housing 102. In one embodiment, the temperature probe stop 136 normally holds the temperature probe 112 within the elongated recess 130, however, an operator may pull the distal end 114 of the temperature probe 112 beyond the temperature probe stop 136 for moving the temperature probe from the retracted position shown in FIG. 5A to the extended position shown in FIG. 1, As the temperature probe 112 is moved into the extended position, the dynamo assembly housing 116 rotates about a center C.

Figure 5B:
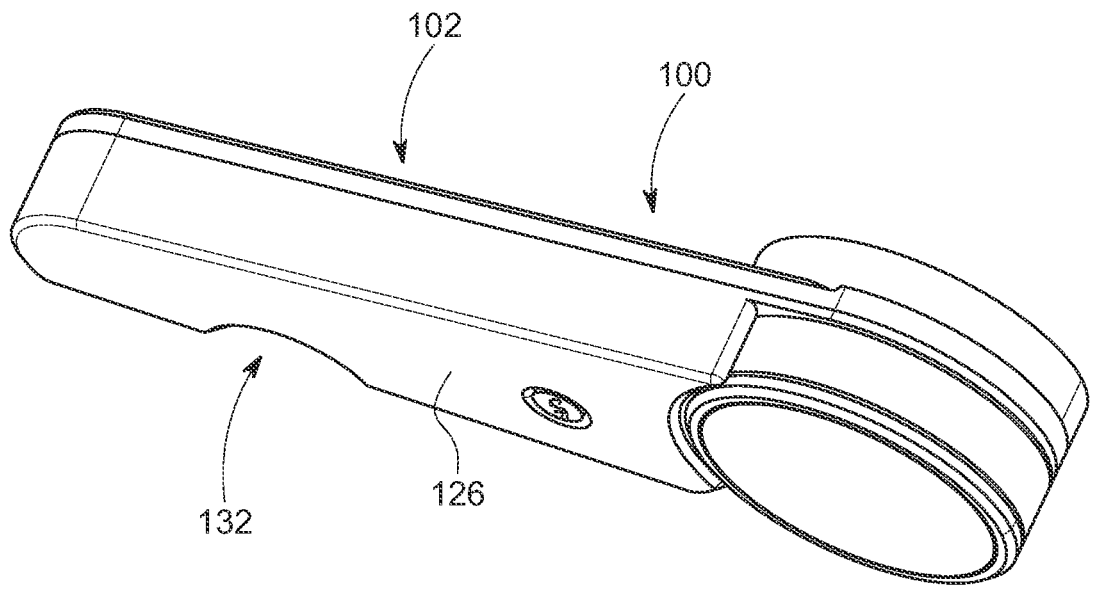
FIG. 5B is a perspective view of a right, underside of the digital cooking thermometer shown in FIG. 4.

Referring to FIG. 5B, in one embodiment, the finger recess 132 is accessible via the bottom surface 126 of the housing 102 of the digital cooking thermometer 100.

Figure 6A:
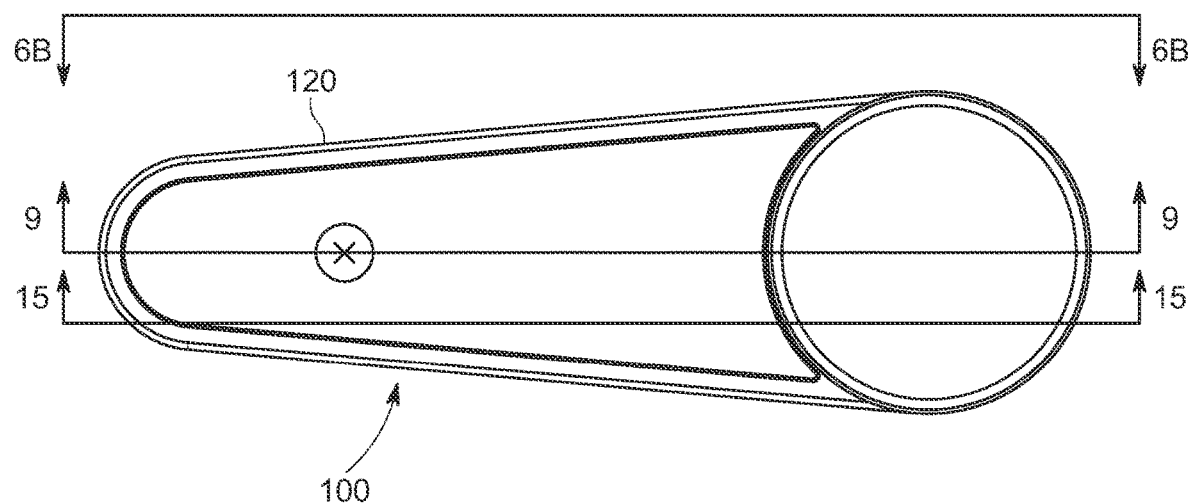
FIG. 6A is a top view of the digital cooking thermometer shown in FIGS. 2, 3A and 3B.
Figure 6B:
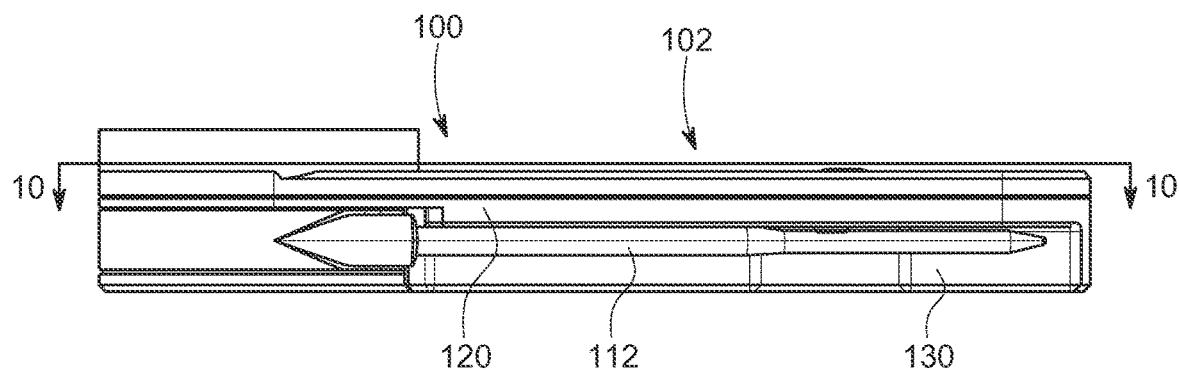
FIG. 6B is a left side view of the digital cooking thermometer h n in FIG. 6A.

Referring to FIGS. 6A and 6B, in one embodiment, an operator may utilize the digital cooking thermometer 100 for obtaining temperature readings for food (e.g., meat; fish) that is being cooked. In one embodiment, when initially grasped by the operator, the temperature probe 112 (FIG. 1)

is in a retracted position for being stored within the elongated recess 130 extending along the second lateral side 120 of the housing 102.

Figure 7:
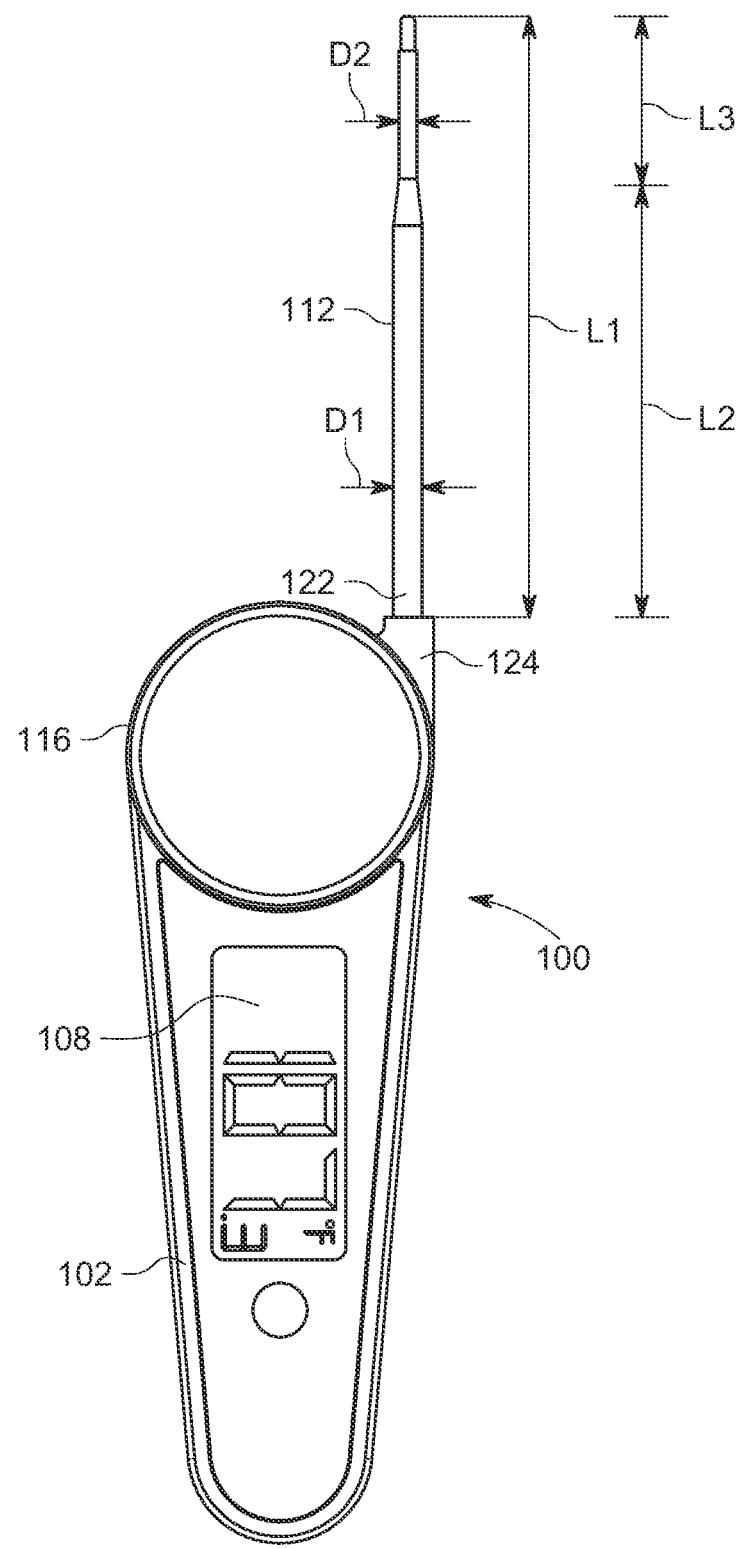
FIG. 7 is a top view of the digital cooking thermometer of FIGS. 6A and 6B with the temperature probe in an extended position, in accordance with one embodiment of the present patent application.

Referring to FIG. 7, in one embodiment, the dynamo assembly housing 116 (FIG. 2) may be rotated about a center for moving (e.g., swiveling) the temperature probe 112 from the retracted position (FIG. 68) to the extended position. The temperature probe 112 preferably includes the proximal end 122 that is coupled with the temperature probe connector 124 for coupling the proximal end of the temperature probe 112 with the rotatable dynamo assembly housing 116.

In one embodiment, the temperature probe 112 preferably has a total length L1 of about 99.5 mm, a proximal section length L2 of about 73 mm, a distal section length L3 of about 26.5 mm, a proximal section diameter D1 of about 4.5 mm, and a distal section diameter D2 of about 1.7 mm.

In one embodiment, rotation of the dynamo assembly housing 116 for placing the temperature probe 112 in the extended position shown in FIG. 7 activates a dynamo assembly located within the dynamo assembly housing 116 for providing electrical power to the digital cooking thermometer 100. The power generated by the dynamo assembly is utilized by the digital cooking thermometer 100 for operating a printed circuit board and displaying temperature readings on the electronic visual display 108 of the housing 102.

Figure 8:
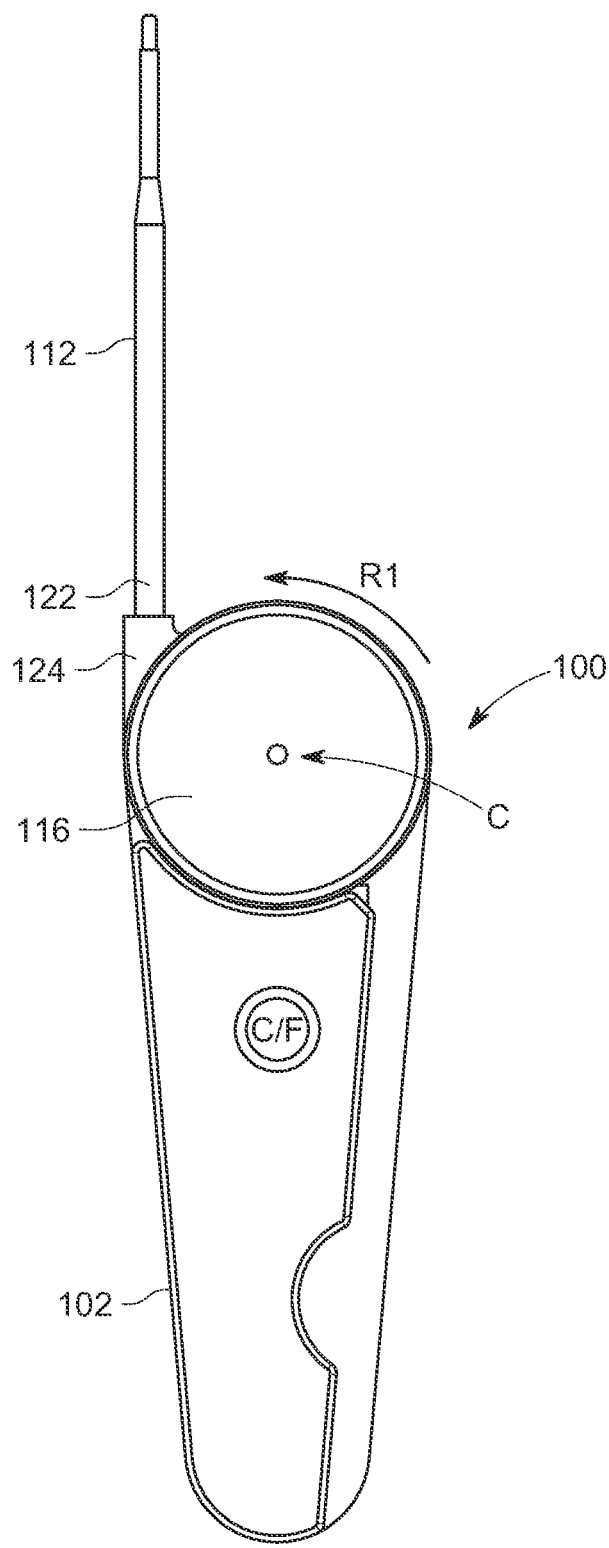
FIG. 8 is a bottom view of the digital cooking thermometer shown in FIG. 7 with the temperature probe in the extended position.

FIG. 8 is a bottom view of the digital cooking thermometer 100 shown in FIG. 7. In FIG. 8, the dynamo assembly housing 116 has been rotated about a center C in the radial direction R1 for positioning the temperature probe 112 into the extended position for extending distally beyond the distal end 106 of the housing 102. The proximal end 122 of the temperature probe 112 is coupled with the dynamo assembly housing 116 via the temperature probe connector 124.

In one embodiment, when the dynamo assembly housing 116 is rotated in the radial direction designated R1, the temperature probe 112 may be moved between the retracted position (FIG. 4) and the extended position (FIG. 8) for positioning the temperature probe 112 for obtaining temperature readings.

Figure 9:
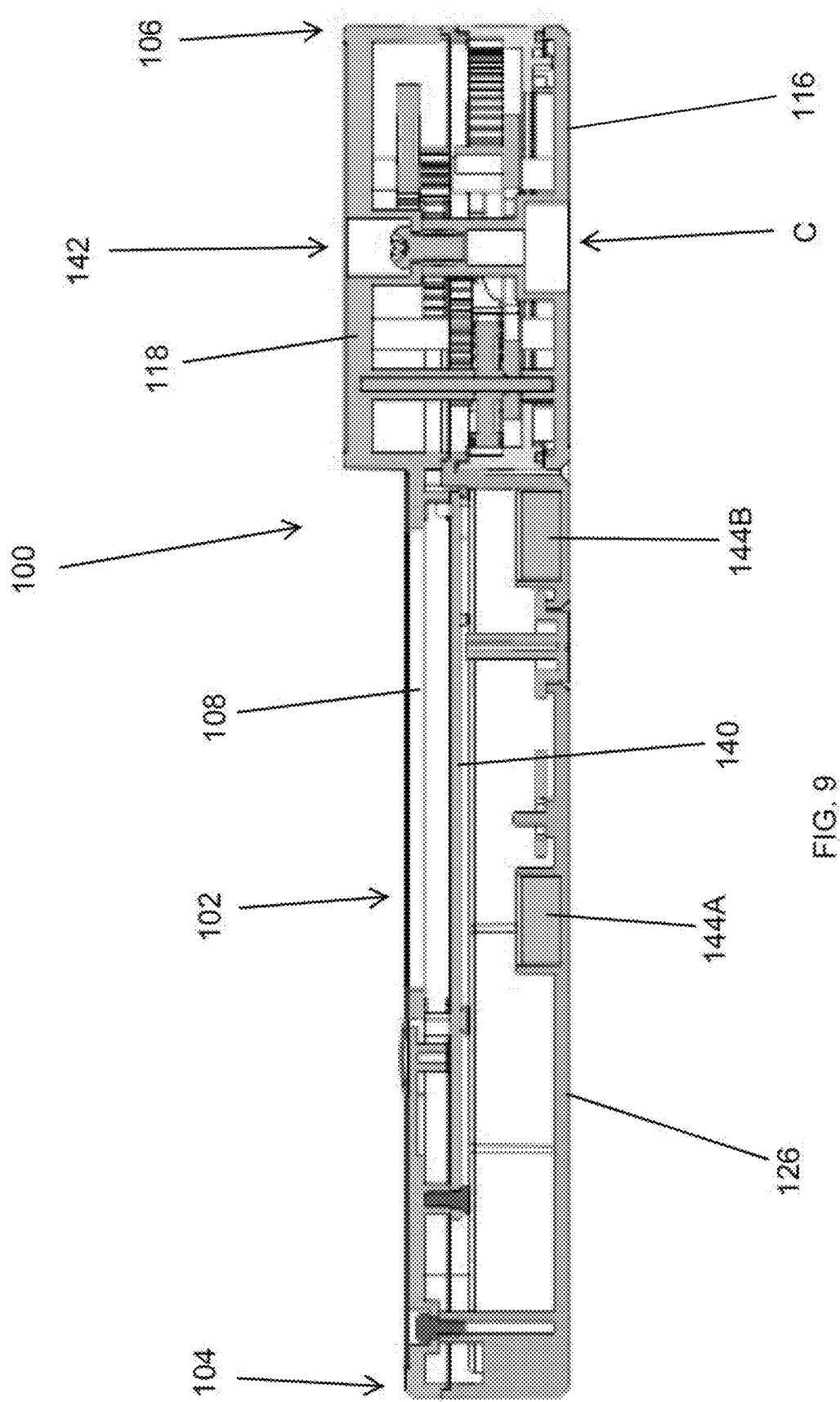
FIG. 9 is a cross-sectional view of the digital cooking thermometer shown in FIG. 6A.

Referring to FIG. 9, in one embodiment, the digital cooking thermometer 100 preferably includes the housing 102 having the proximal end 104 and the distal end 106. In one embodiment, the digital cooking thermometer 100 preferably includes a printed circuit board 140 that is in communication with the temperature probe 112 (FIG. 1). In one embodiment, the printed circuit board 140 is also desirably in communication with the electronic visual display 108 that is utilized for displaying the temperature readings obtained by the temperature probe.

In one embodiment, the digital cooking thermometer 100 preferably includes a dynamo assembly 142 that is disposed between the dynamo assembly housing 116 and the cover 118 located at the distal end 106 of the housing 102. In one embodiment, the dynamo assembly housing 116 may be rotated about a center C for moving the temperature probe between the retracted position shown in FIG. 4 and the extended position shown in FIG. 8. During movement of the temperature probe from the retracted position to the extended position, the dynamo assembly housing 116 is preferably rotated about the center C for activating the dynamo assembly 142, which, in turn, generates electrical power that is transmitted to the printed circuit board 140 and the electronic visual display 108 for operating the digital cooking thermometer 100.

In one embodiment, the digital cooking thermometer 100 may include first and second magnets 144A, 144B that are located adjacent the bottom surface 126 of the housing 102 for enabling the digital cooking thermometer 100 to be magnetically coupled with a metal surface such as the cover of a barbeque grill. The first and second magnets 144A, 144B preferably generate a magnetic field that attracts the bottom surface 126 of the housing 102 to an opposing metal surface for securing and/or holding the digital cooking thermometer 100 to the metal surface.

Figure 10:
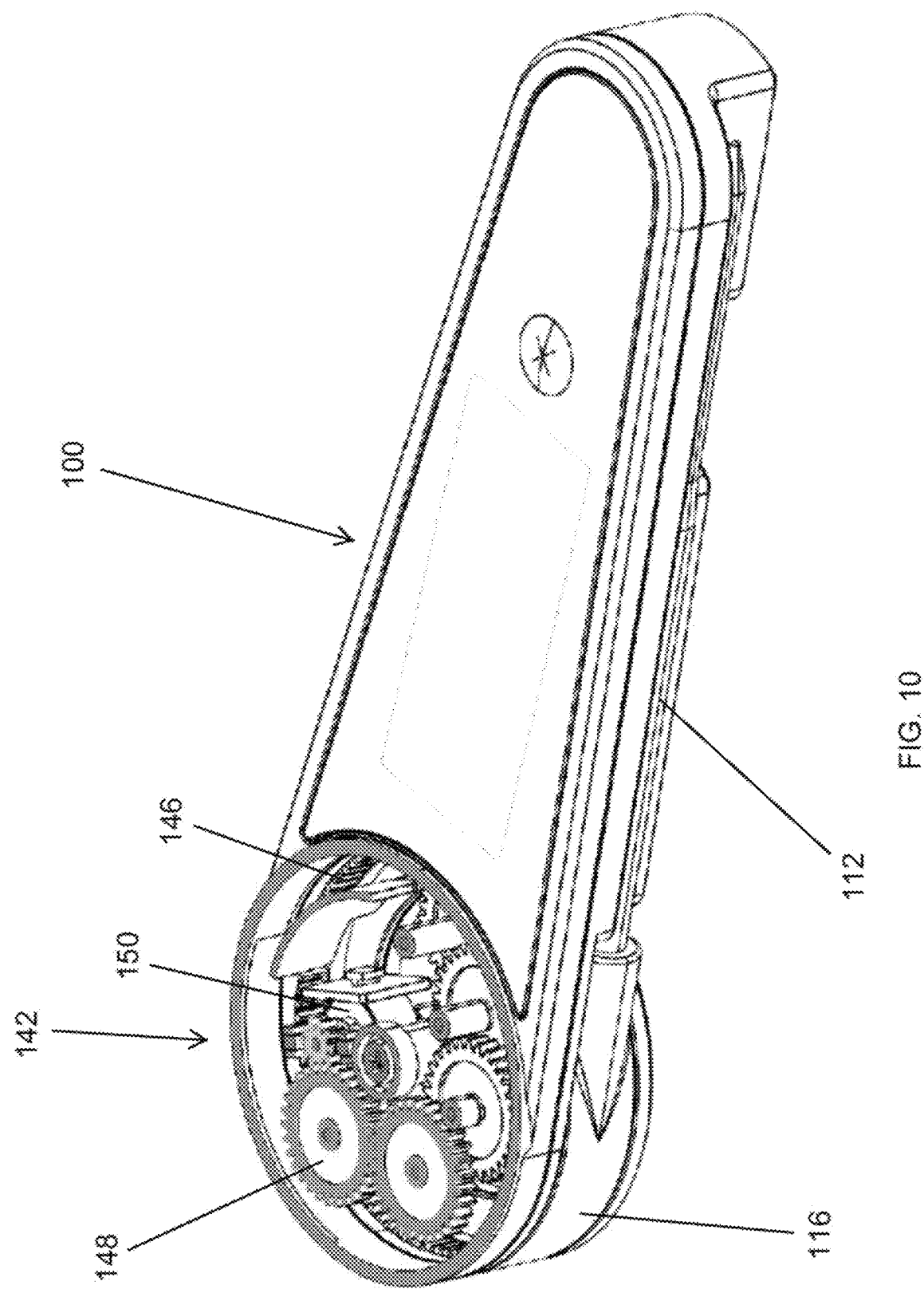
FIG. 10 is a partial cross-sectional view of a distal end of the digital cooking thermometer shown in FIG. 6B.

Referring to FIG. 10, in one embodiment, the dynamo assembly 142 is preferably disposed within the rotatable dynamo assembly housing 116. The dynamo assembly 142 preferably includes one or more gears that are coupled with a magnet/coil subassembly. In one embodiment, the dynamo assembly 142 may include a ring gear 146 having gear teeth that extends around an inner surface of the rotatable dynamo assembly housing 116. The dynamo assembly 142 preferably includes a series of clears 148 that are coupled with the ring gear 146 of the dynamo assembly housing 116. In one embodiment, as the dynamo assembly housing 116 is rotated for moving the temperature probe 112 into the extended position (FIG. 1), the teeth of the ring gear 146 engage the teeth of one of the series of gears 148 for rotating a magnet within a coil housing 150 for generating electrical power that is utilized for operating the digital cooking thermometer 100.

Figure 11:
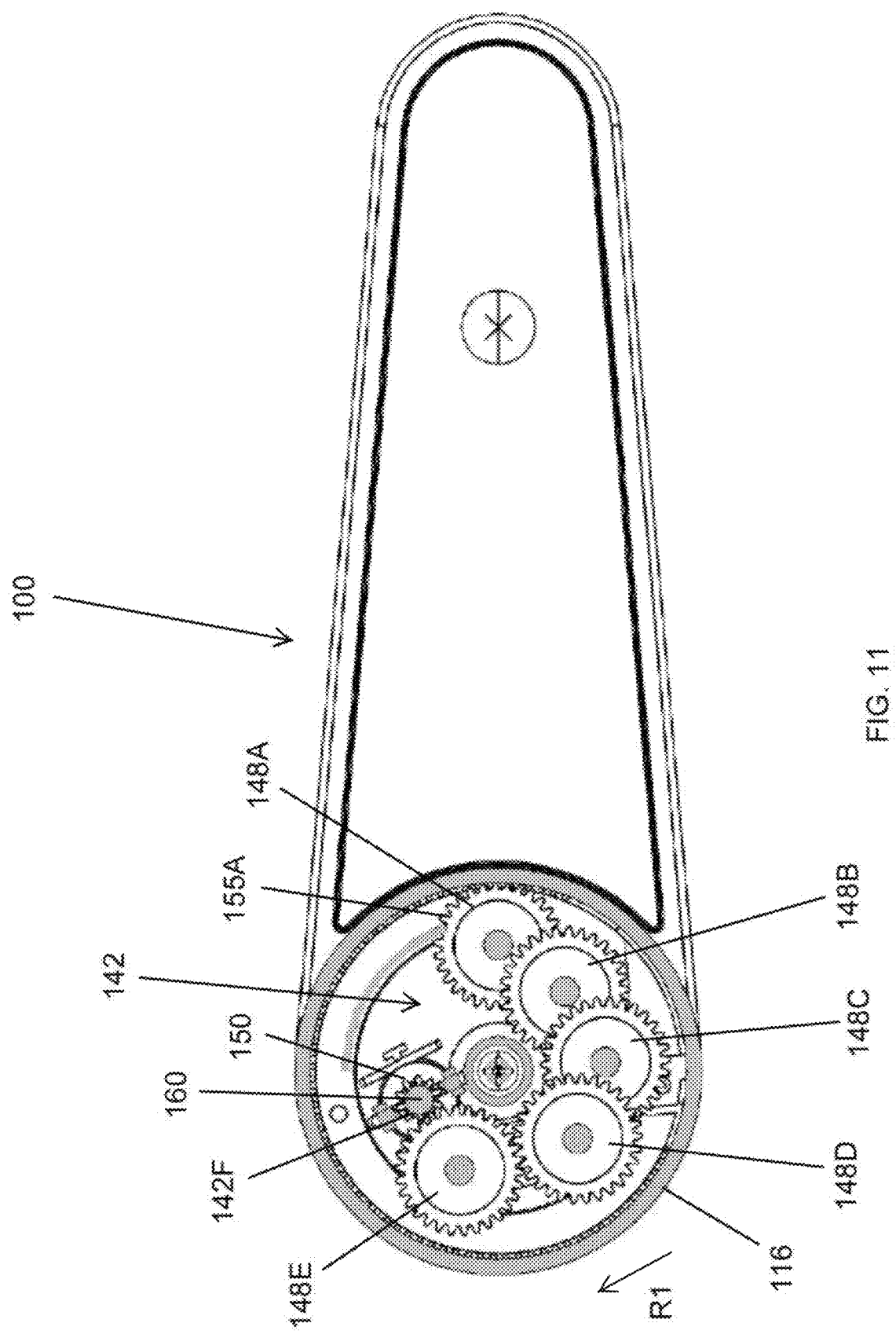
FIG. 11 is a top view of the digital cooking thermometer shown in FIG. 10.
Figure 12:
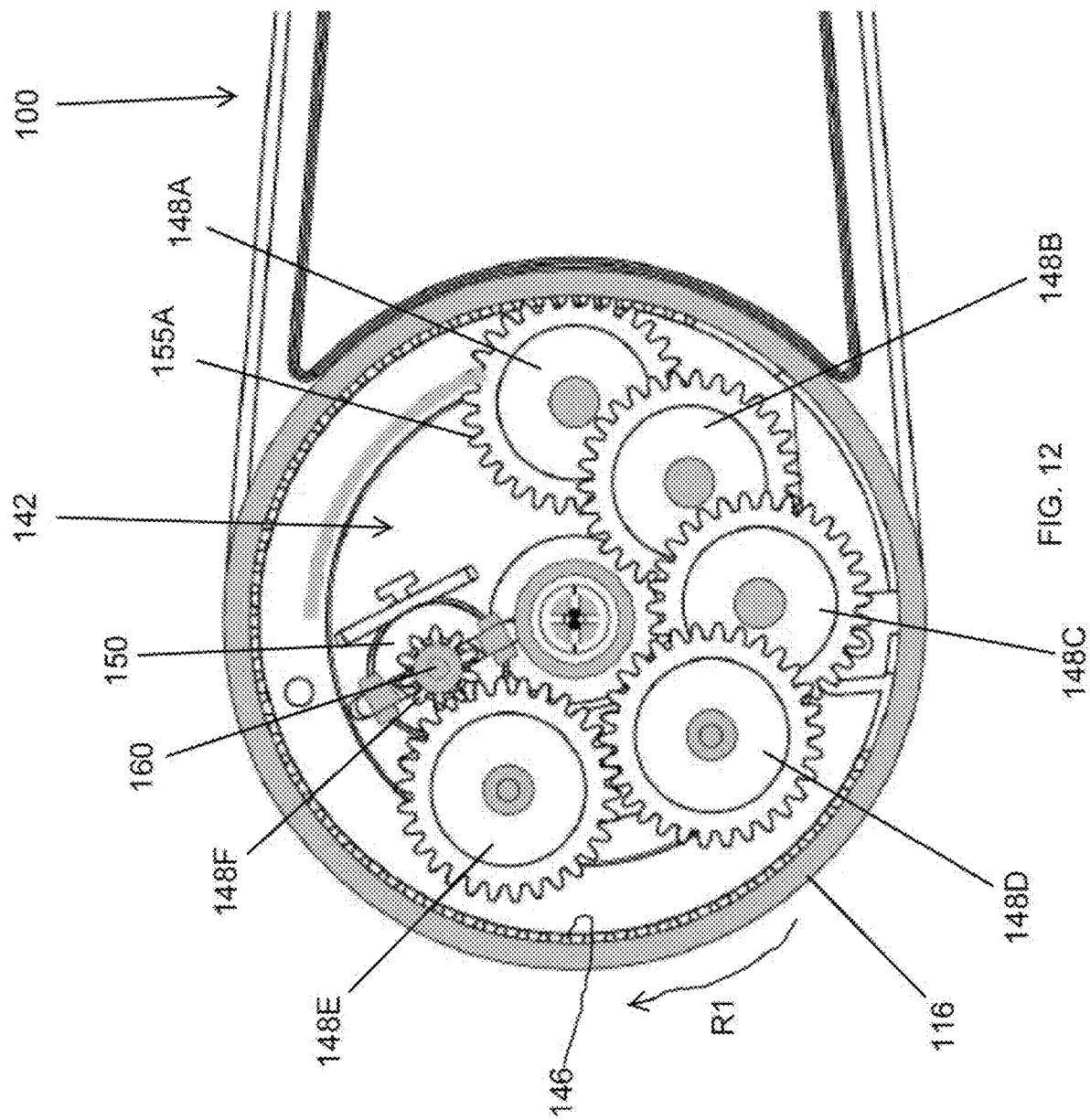
FIG. 12 is a magnified view of the distal end of the digital cooking thermometer shown in FIG. 11.

Referring to FIGS. 11 and 12, in one embodiment, the dynamo assembly 142 contained within the rotatable dynamo assembly housing 116 preferably includes a series of gears 148A-148F that are linked together within the interior of the rotatable dynamo assembly housing 116. In one embodiment, a first gear 148A of the series of gears has external teeth 155A that engage the opposing teeth of the ring gear 146. As the rotatable dynamo assembly housing 116 is rotated in the radial direction designated R1, the ring gear 146 rotates the first gear 148A, which, in turn, rotates the second gear 148B, which, in turn, rotates the third gear 1480, which, in turn, rotates the fourth gear 148D, which, in turn, rotates the fifth gear 148E, which, in turn, rotates the sixth gear 148F. In one embodiment, as the sixth gear 148F rotates, the sixth gear 148F, in turn, rotates a shaft 160 (e.g., a vertical shaft) that is connected with a rotatable magnet disposed within the coil housing 150. The rotation of the magnet relative to the coil housing 150 preferably generates an electrical current and/or electrical power that is used for operating the digital cooking thermometer 100.

Referring to FIG. 12, in one embodiment, as the sixth gear 148F rotates, the sixth gear 148F simultaneously rotates the shaft 160 that is connected with the rotatable magnet (not shown). The lower end of the shaft 160 is connected to the rotatable magnet (not shown) that is contained within the coil housing 150. The combination of the rotating magnet 160 and the stationary coil housing 150 comprises a dynamo that generates electrical current that is transmitted to the printed circuit board of the digital cooking thermometer 100 for powering and/or operating the device.

Figure 13:
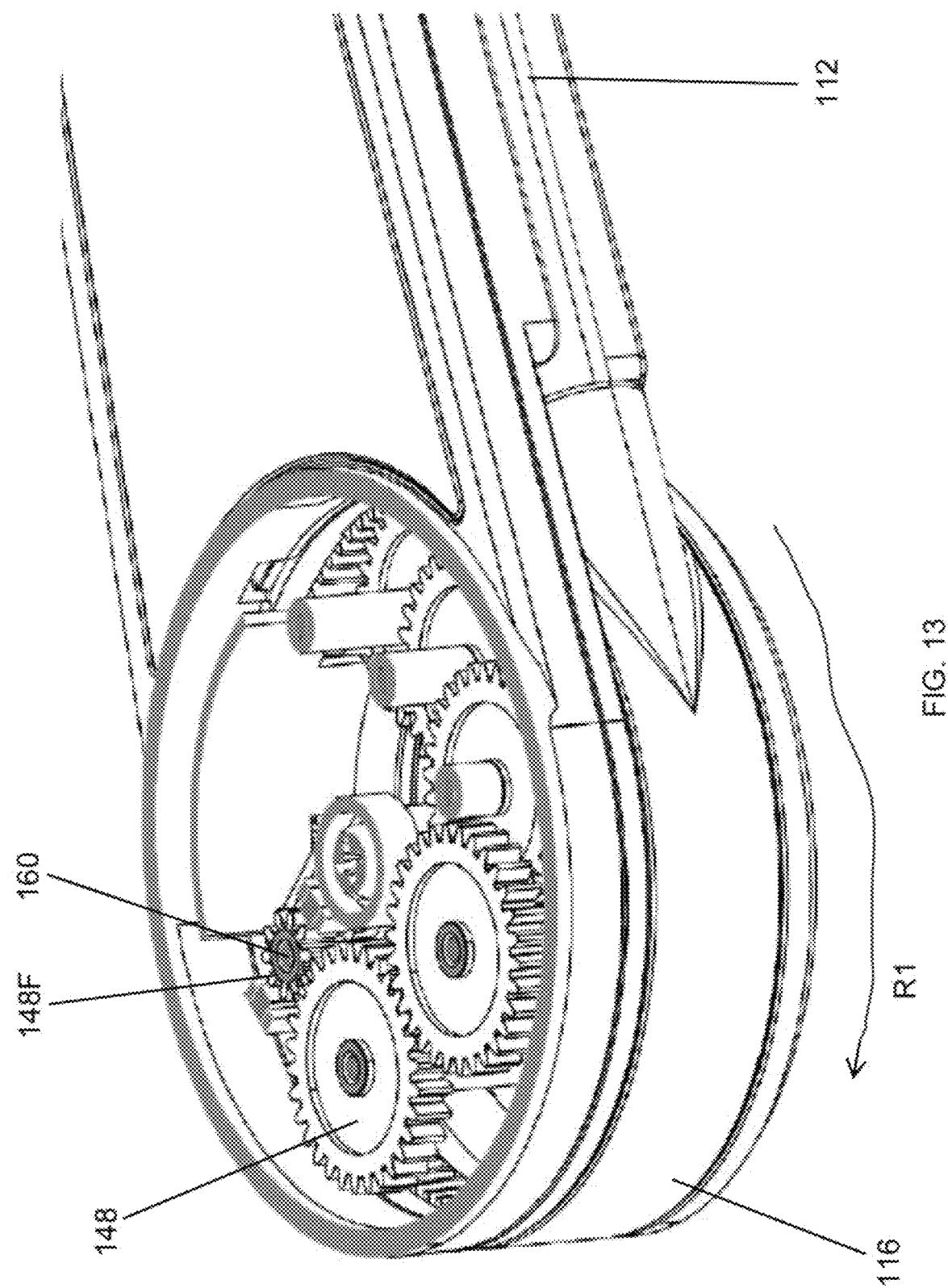
FIG. 13 is a perspective view of the distal end of the digital cooking thermometer shown in FIGS. 11 and 12.

Referring to FIG. 13, in one embodiment, as the dynamo assembly housing 116 is rotated in the radial direction R1 for moving the temperature probe 112 from the retracted position to the extended position, the series of gears 148 contained within the dynamo assembly housing 116 are rotated. Rotation of the sixth gear 148F results in rotation of the shaft 160 that is connected to the magnet disposed within the coil housing 150 (FIG. 12).

Figure 14:
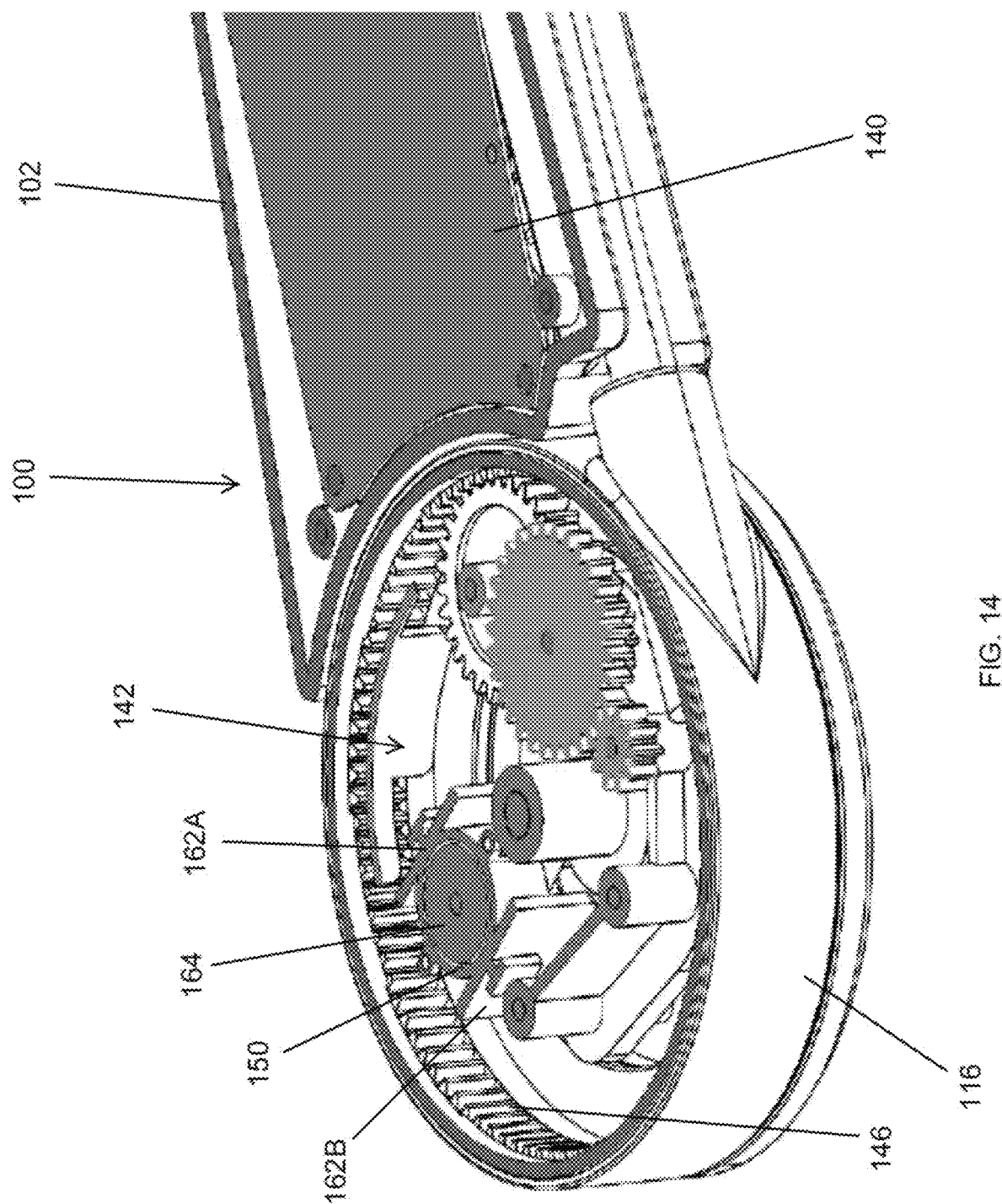
FIG. 14 is a cross-sectional view of a distal end of a digital cooking thermometer, in accordance with embodiment of the present patent application.

Referring to FIG. 14, in one embodiment, the coil housing 150 preferably includes first and second coils 162A, 162B that contain the rotatable magnet 164. The shaft 160 (FIG. 12) is connected with the magnet 164 so that the magnet rotates simultaneously with the shaft 160. Rotation of the shaft 160 results in rotation of the magnet 164 relative to the first and second coils 162A, 162B of the coil housing 150. As the magnet 164 rotates relative to the first and second coils 162A, 162B, the dynamo assembly 142 generates direct electrical current that is conveyed to the printed circuit board 140 disposed within the housing 102 of the digital cooking thermometer 100.

Figure 15:
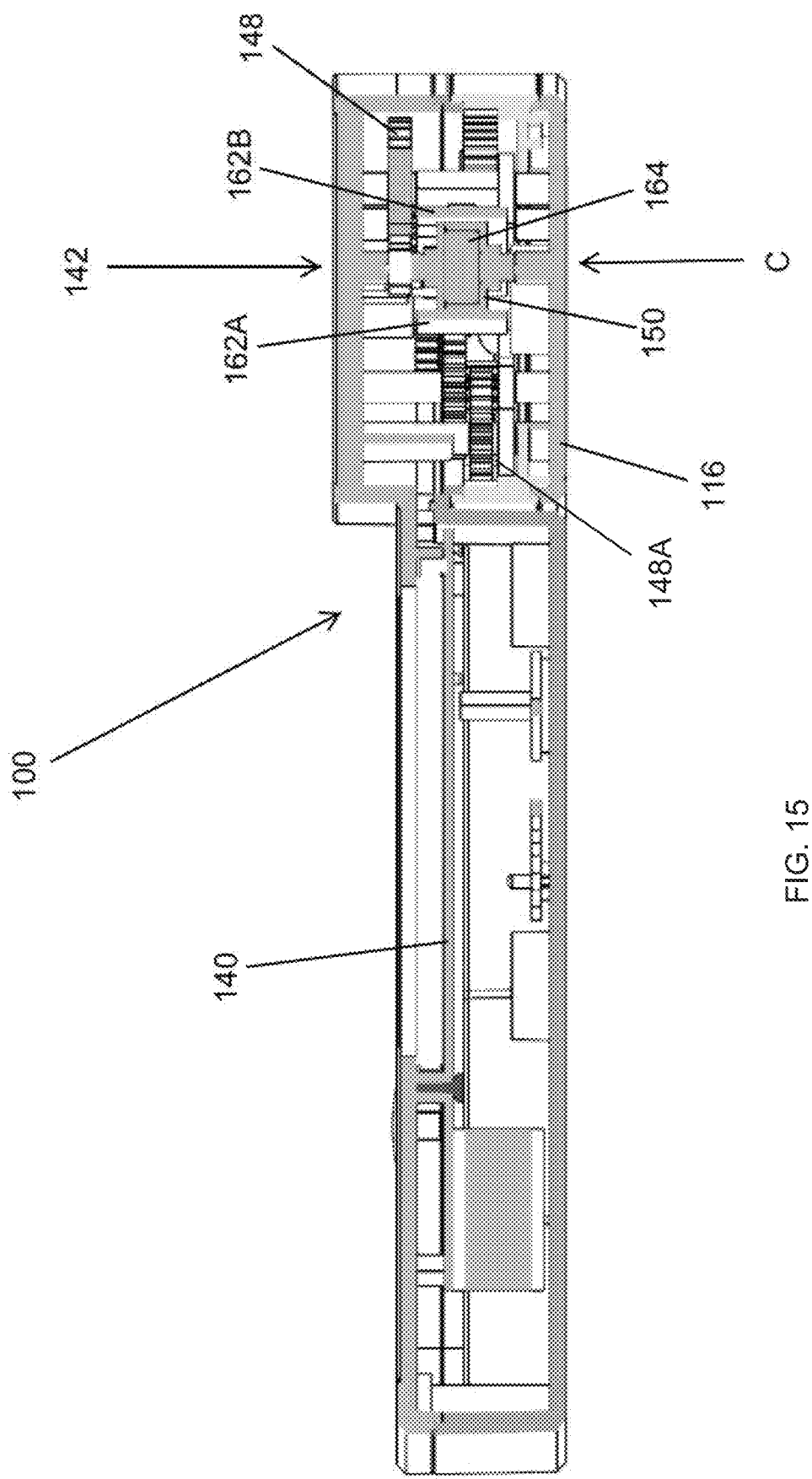
FIG. 15 is a cross-sectional view of the digital cooking thermometer shown in FIG. 6A including a dynamo assembly that is configured for generating electrical power for operating the digital cooking thermometer, in accordance with one embodiment of the present patent application.

Referring to FIG. 15, in one embodiment, the rotatable dynamo assembly housing 116 desirably includes the ring gear 146 (FIG. 14) having gear teeth that mesh with the first gear 148A of the series of gears 148A-148F (FIG. 11). The digital cooking thermometer 100 preferably includes the dynamo assembly 142 including the coil housing 150 and the magnet 164 disposed within the coil housing.

Figure 16:
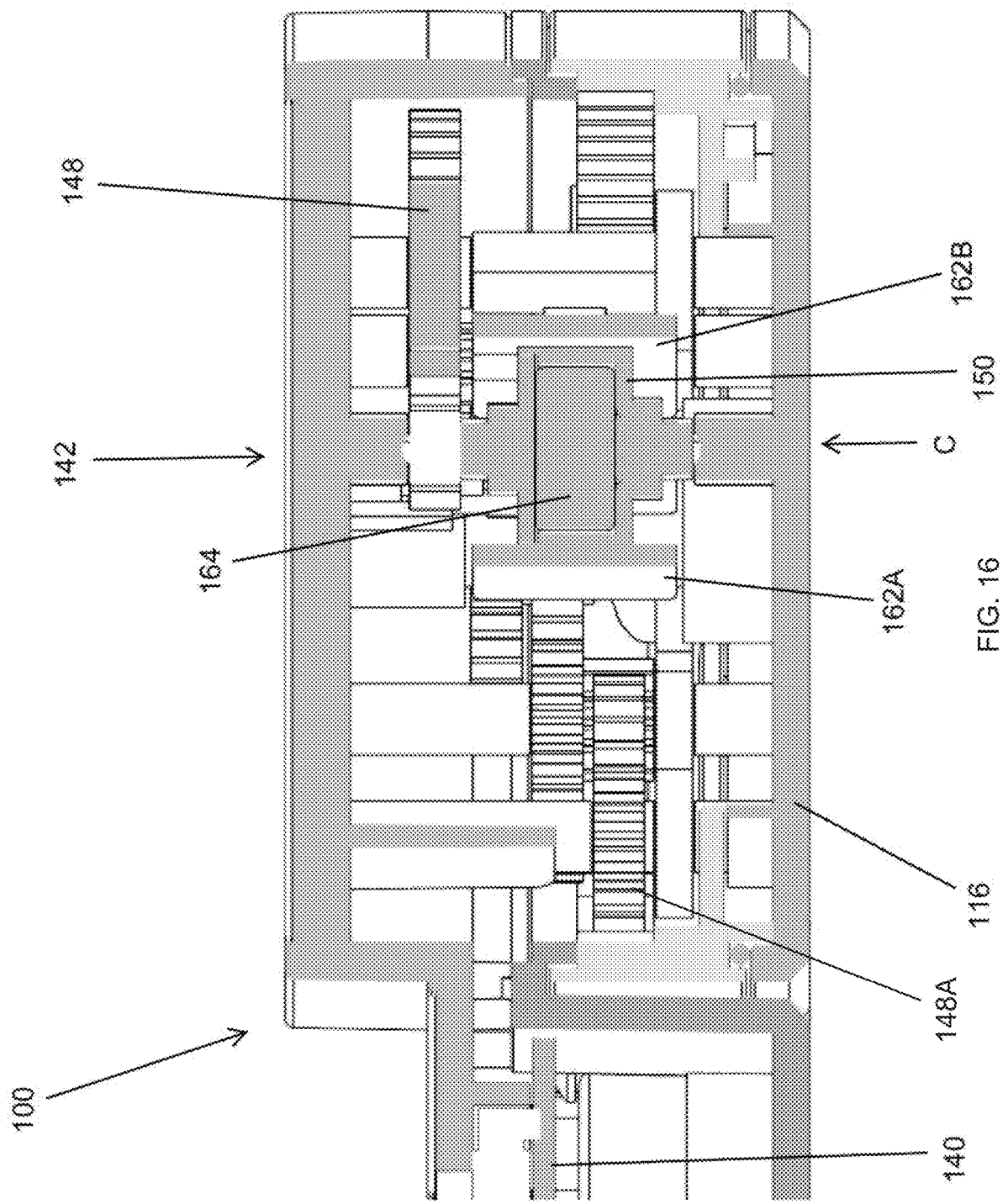
FIG. 16 is a magnified view of the dynamo assembly shown in FIG. 15.

Referring to FIG. 16, in one embodiment, the dynamo assembly 142 preferably includes the gear train 148 disposed within the rotatable dynamo assembly housing 116, the coil housing 150 having the first coil 162A and the second coil 162B, and the magnet 164 disposed within the coil housing 150.

In one embodiment, as the dynamo assembly housing 116 is rotated about a center C thereof for moving the temperature probe into the extended position, the ring gear 146 (FIG. 14) of the rotatable dynamo assembly housing 116 activates the series of gears 148A-148F (FIG. 11) of the gear train, which, in turn, rotates the shaft 160 (FIG. 11) and the magnet 164 disposed within the coil housing 150 for generating electrical current that is transmitted to the printed circuit board 140 for providing electrical power for operating the digital cooking thermometer 100.

Figure 17A:
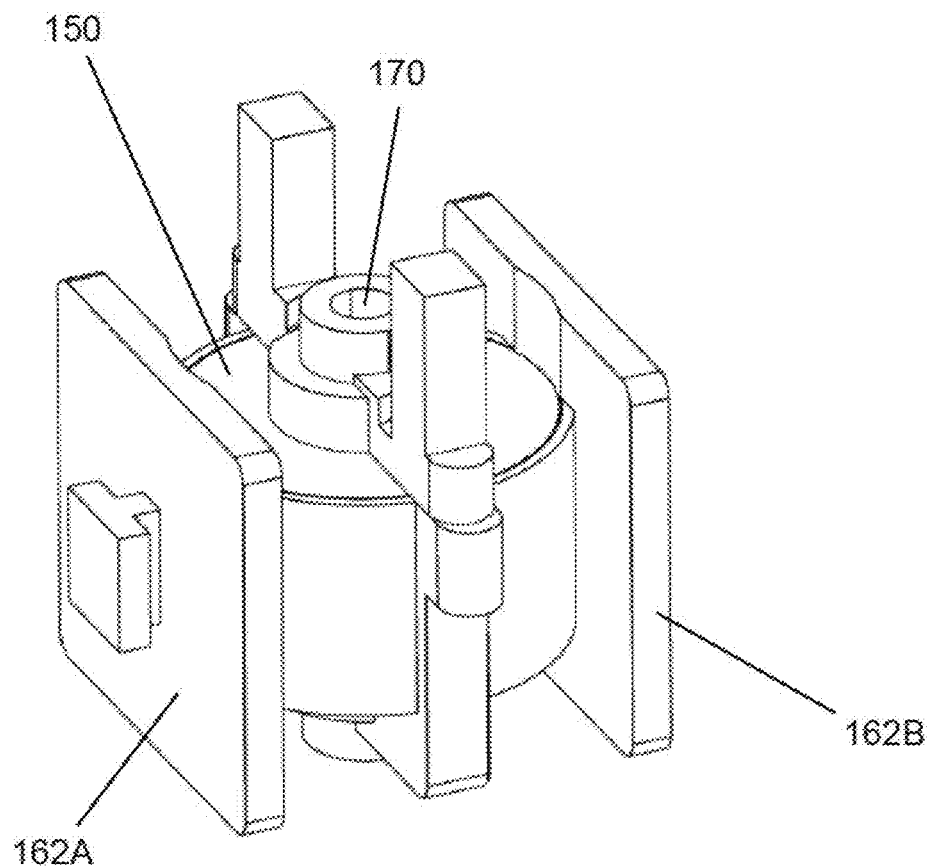
FIG. 17A is a perspective view of a coil housing of a dynamo assembly of a digital cooking thermometer, in accordance with one embodiment of the present patent application.

Referring to FIG. 17A, in one embodiment, the coil housing 150 preferably includes the first coil 162A and the second coil 162B. The coil housing 150 preferably includes a shaft opening 170 that extends therethrough from an upper end to a lower end of the coil housing 150. The rotatable shaft 160 (FIG. 12) preferably extends through the shaft opening 170 for engaging the rotatable magnet 164 (FIG. 17) disposed within the coil housing 150.

Figure 17B:
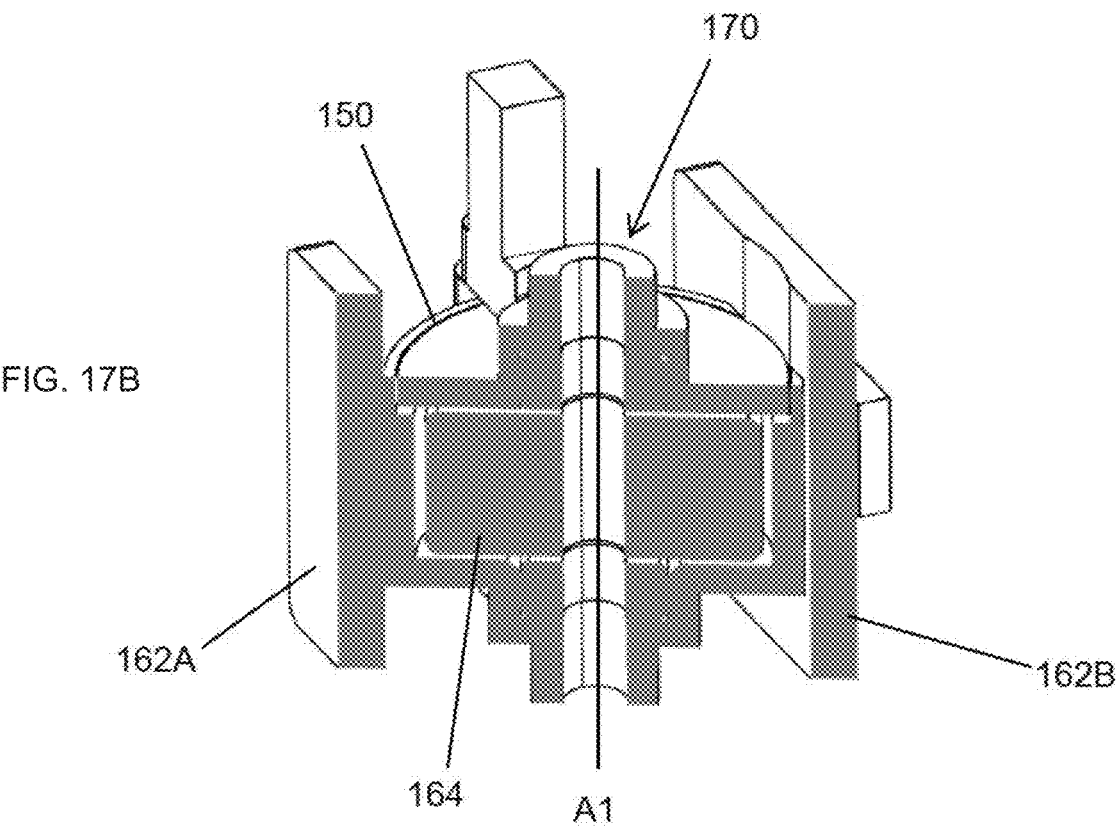
FIG. 17B is a cross-sectional view of the coil housing of the dynamo assembly shown in FIG. 17A with a rotatable magnet disposed inside the coil housing, in accordance with one embodiment of the present patent application.

FIG. 17B shows the rotatable magnet 164 disposed within the coil housing 150. The magnet 164 preferably rotates about the elongated axis Ai of the rotatable shaft 160 (FIG. 11) that extends through the shaft opening 170. In one embodiment, as the magnet 164 rotates relative to the first and second coils 162A, 162E of the coil housing 150, the dynamo assembly 142 (FIG. 17) generates direct current that is supplied to the printed circuit board of the digital cooking thermometer for powering the device. In one embodiment, the electrical power is also supplied to the electronic visual display 108 (FIG. 1) that is utilized for displaying temperature readings obtained by using the temperature probe.

Figure 18:
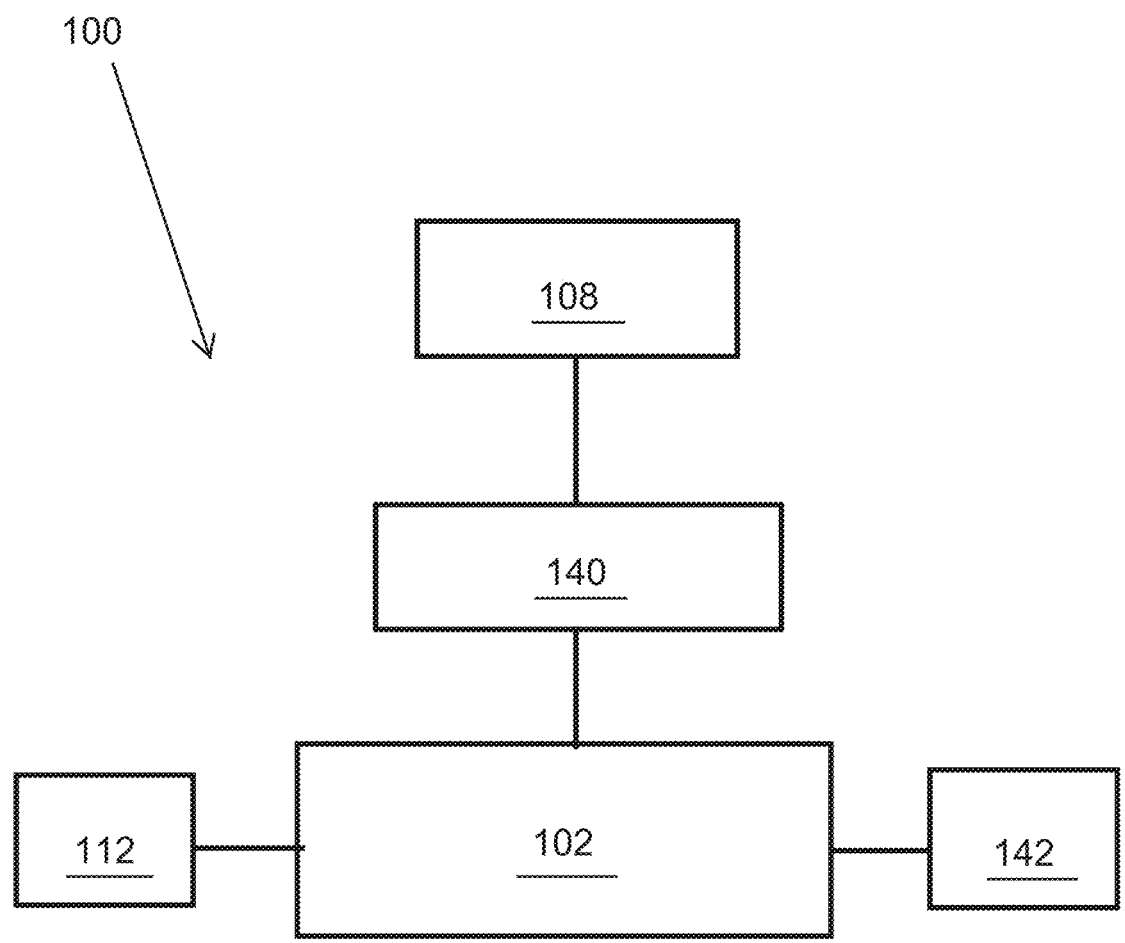
FIG. 18 is a schematic view of a digital cooking thermometer including a dynamo configured to provide electrical power, a printed circuit board, a visual display, and a temperature probe configured to obtain temperature readings, in accordance with one embodiment of the present patent application.

Referring to FIG. 18, in one embodiment, the digital cooking thermometer 100 preferably includes a housing 102 that may contain a printed circuit board 140 and an electronic visual display 108. In one embodiment, the digital cooking thermometer desirably includes a dynamo assembly 142 that is configured to generate electrical current and/or power for operating the device. The digital cooking thermometer 100 may also include a temperature probe 112 that is configured to obtain temperature readings that are transmitted to the printed circuit board 140.

In one embodiment, the printed circuit board 140 is configured to receive electrical signals from the temperature probe 112 and process the electrical signals for being displayed on the electronic visual display 108. The electronic visual display 108 may be a liquid crystal display or a light emitting diode (LED) display.

In one embodiment, the dynamo assembly 142 is activated when the temperature probe is moved (e.g., swiveled) from the retracted position to the extended position. In one embodiment, the dynamo assembly 142 preferably generate sufficient electrical power to operate the digital cooking thermometer 100 (i.e., obtain and display temperature readings on the electronic visual display) for approximately 30-40 seconds). In one embodiment, the device can be re-energized for an additional 30-40 seconds by again moving the dynamo assembly 142. In one embodiment, the device may be energized by either extending or retracting the temperature probe 112 relative to the housing 102.

Figure 19:
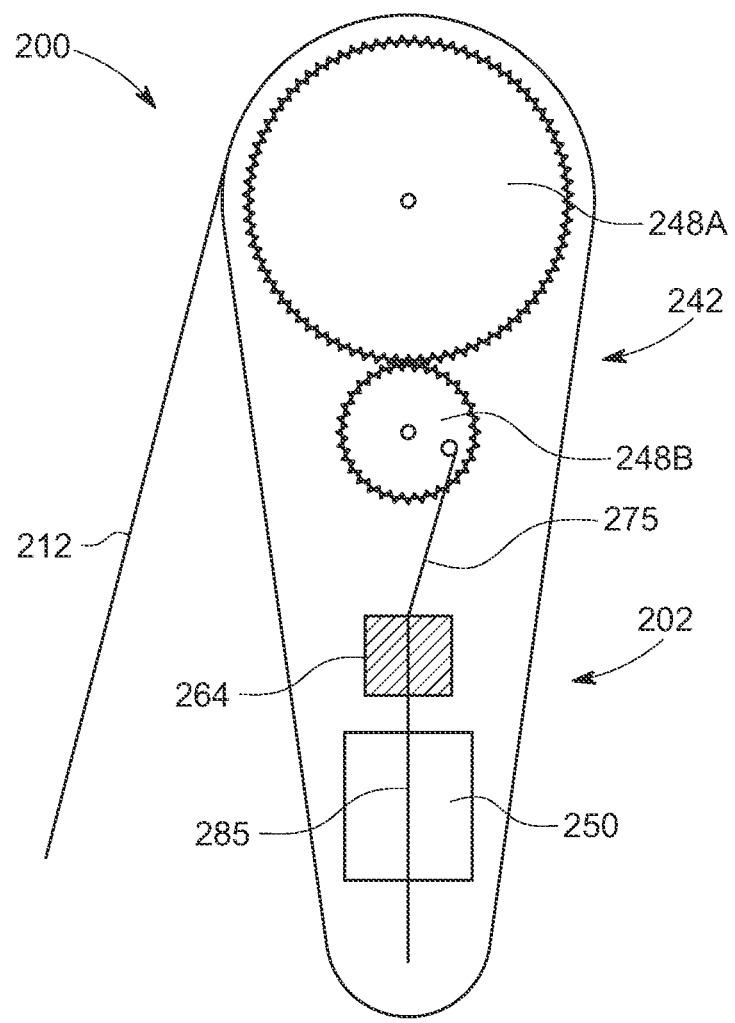
FIG. 19 is a schematic view of a digital cooking thermometer including a dynamo power source and a temperature probe configured to move between retracted and extended positions, in accordance with one embodiment of the present patent application.

Referring to FIG. 19, in one embodiment, a digital cooking thermometer 200 preferably includes a housing 202 that may contain a printed circuit board (not shown) and an electronic visual display (not shown). In one embodiment, the digital cooking thermometer 200 desirably includes a dynamo assembly 242 that is configured to generate electrical current and/or electrical power for operating the device. The electrical power may be utilized by the printed circuit board and the electronic visual display.

In one embodiment, the digital cooking thermometer 200 preferably includes a temperature probe 212 that is configured to obtain temperature readings that are transmitted to the printed circuit board (not shown) and that may be displayed upon the electronic visual display (not shown).

In one embodiment, the dynamo assembly 242 preferably includes a first rotatable gear 248A, a second rotatable gear 248B that meshes with the first rotatable gear 248A, a magnet 264, and a coil 250. In one embodiment, the magnet 264 is configured to move relative to the coil 250 for generating an electrical current that is utilized for powering the digital cooking thermometer 200.

In one embodiment, the dynamo assembly 242 desirably includes a magnet advancer shaft 275 that interconnects the second gear 248B and the magnet 264, and a magnet guide shaft 285 that is configured for guiding movement of the magnet 264 relative to the coil 250.

In one embodiment, the dynamo assembly 142 is activated when the temperature probe 212 is moved (e.g., swiveled) from a retracted position (FIG. 4) to an extended position (FIG. 7).

In one embodiment, the movement of the temperature probe 212 is linked to rotation of the first rotatable gear 248A, In one embodiment, the temperature probe 212 is moved into an extended position, which, in turn, rotates the first rotatable gear 248A, which, in turn, rotates the second rotatable gear 248B. As the second rotatable gear 248B is rotated, the magnet advancer shaft 275 forces the magnet 264 to slide along the magnet guide shaft 285 for moving the magnet 264 relative to the coil 250 for generating an electrical current that may be used for providing electrical power for operating the digital cooking thermometer 200.

In one embodiment, the dynamo assembly 242 preferably generate sufficient electrical power to operate the digital cooking thermometer 200 (i.e., obtain and display temperature readings on the electronic visual display) for approximately 30-40 seconds). In one embodiment, the device can be re-energized for an additional 30-40 seconds by again moving the dynamo assembly 242. In one embodiment, the device may be energized by either extending or retracting the temperature probe 212 relative to the housing 202.

While the foregoing is directed to embodiments of the present invention, other and further embodiments of the invention may be devised without departing from the basic scope thereof, which is only limited by the scope of the claims that follow. For example, the present invention contemplates that any of the features shown in any of the embodiments described herein, or incorporated by reference herein, may be incorporated with any of the features shown in any of the other embodiments described herein, or incorporated by reference herein, and still fall within the scope of the present invention,

What is claimed is:

1. A digital cooking thermometer comprising:
   a housing having a proximal end and a distal end;
   a printed circuit board disposed within said housing;
   an electronic visual display in communication with said printed circuit board;
   a dynamo assembly housing coupled with the distal end of said housing and being configured to rotate relative to said housing;
   a dynamo assembly disposed within said dynamo assembly housing, wherein said dynamo assembly is in communication with said printed circuit board and is configured to generate electrical current upon rotation of said dynamo assembly housing;
   a temperature probe coupled with said dynamo assembly housing, wherein said temperature probe includes a sensor for obtaining temperature readings that are transmitted to said printed circuit board, wherein said temperature probe is moveable from a retracted position in which said temperature probe extends along a side of said housing to an extended position in which said temperature probe extends distally beyond the distal end of said housing, and wherein said temperate probe simultaneously rotates said dynamo assembly housing as said temperature probe is moved from the retracted position to the extended position.

2. The digital cooking thermometer as claimed in claim 1, wherein said housing is made of materials selected from the group consisting of plastic and metal.

3. The digital cooking thermometer as claimed in claim 1, wherein said electronic visual display is disposed on said housing and is configured for displaying temperature readings obtained by said temperature probe.

4. The digital cooking thermometer as claimed in claim 1, further comprising a conductive pathway extending between said sensor and said printed circuit board for transmitting temperature readings from said sensor to said printed circuit board.

5. The digital cooking thermometer as claimed in claim 1, wherein said dynamo assembly comprises a series of rotatable gears that are disposed within said dynamo assembly housing.

6. The digital cooking thermometer as claimed in claim 5, wherein said dynamo assembly housing comprises a ring gear that surrounds said series of rotatable gears, and wherein said ring gear includes gear teeth that mesh with a gear of said series of rotatable gears.

7. The digital cooking thermometer as claimed in claim 5, wherein said dynamo assembly further comprises a coil housing and a rotatable magnet disposed within said coil housing that is configured to rotate relative to said coil housing for generating the electrical current.

8. The digital cooking thermometer as claimed in claim 7, wherein said dynamo assembly further comprises a rotatable shaft having an upper end coupled with a second gear of said series of rotatable gears and a lower end coupled with said magnet.

9. The digital cooking thermometer as claimed in claim 1, further comprising a depressible temperature hold button accessible at an outer surface of said housing, wherein said depressible temperature hold button is in communication with said printed circuit board.

10. The digital cooking thermometer as claimed in claim 1, further comprising a temperature unit display button accessible at an outer surface of said housing that is depressible a first time for displaying temperature readings on said electronic visual display in Celsius and a second time for displaying the temperature readings on said electronic visual display in Fahrenheit.

11. A digital cooking thermometer comprising:
    a housing having a proximal end and a distal end;
    a printed circuit board disposed within said housing;
    an electronic visual display in communication with said printed circuit board;
    a dynamo assembly in communication with said printed circuit board, wherein said dynamo assembly is configured to generate electrical current that is supplied to said printed circuit board for operating said digital cooking thermometer;
    a temperature probe coupled with said dynamo assembly, wherein said temperature probe is moveable from a retracted position in which said temperature probe extends along a side of said housing to an extended position in which said temperature probe extends distally beyond the distal end of said housing, and wherein said temperate probe, as said temperature probe is moved from the retracted position to the extended position, simultaneously activates said dynamo assembly for generating the electrical current.

12. The digital cooking thermometer as claimed in claim 11, further comprising:
    a sensor located at a distal end of said temperature probe for obtaining temperature readings;
    a conductive pathway extending between said sensor and said printed circuit board for transmitting temperature readings from said sensor to said printed circuit board.

13. The digital cooking thermometer as claimed in claim 11, further comprising:
    a dynamo assembly housing coupled with the distal end of said housing and being configured to rotate relative to said housing;
    said dynamo assembly being disposed within said dynamo assembly housing, wherein said temperate probe simultaneously rotates said dynamo assembly housing as said temperature probe is moved from the retracted position to the extended position.

14. The digital cooking thermometer as claimed in claim 13, wherein said dynamo assembly comprises a series of rotatable gears that are disposed within said dynamo assembly housing.

15. The digital cooking thermometer as claimed in claim 14, wherein said dynamo assembly housing comprises a ring gear that surrounds said series of rotatable gears, and wherein said ring gear includes gear teeth that mesh with a gear of said series of rotatable gears.

16. The digital cooking thermometer as claimed in claim 15, wherein said dynamo assembly further comprises a coil housing and a rotatable magnet disposed within said coil housing that is configured to rotate relative to said coil housing for generating the electrical current.

17. The digital cooking thermometer as claimed in claim 16, wherein said series of rotatable gears are coupled with said rotatable magnet.

18. The digital cooking thermometer as claimed in claim 17, further comprising a rotatable shaft having an upper end coupled with a second gear of said series of rotatable gears and a lower end coupled with said rotatable magnet.

19. The digital cooking thermometer as claimed in claim 18, wherein moving said temperature probe from the retracted position to the extended position activates said dynamo assembly to generate a sufficient quantity of the electrical current to operate said digital cooking thermometer for about 30-40 seconds.

20. A digital cooking thermometer comprising:
a housing having a proximal end and a distal end;
a printed circuit board disposed inside said housing;
an electronic visual display disposed on said housing and being in communication with said printed circuit board;
a dynamo assembly housing coupled with said housing and being configured to rotate relative to an end of said housing;
a dynamo assembly disposed within said dynamo assembly housing, wherein said dynamo assembly is activated by rotating said dynamo assembly housing for generating electrical current that is supplied to said printed circuit board for providing electrical power to operate said digital cooking thermometer;
a temperature probe coupled with said dynamo assembly housing, wherein said temperature probe includes a sensor for obtaining temperature readings that are transmitted to said printed circuit board, wherein said temperature probe is moveable from a retracted position to an extended position for simultaneously rotating said dynamo assembly housing, which, in turn, activates said dynamo assembly for generating the electrical current.

* * * * *